(12) United States Patent
Henninger

(10) Patent No.: US 10,260,412 B2
(45) Date of Patent: Apr. 16, 2019

(54) FOUR-STROKE RECIPROCATING PISTON ENGINE IN A V CONFIGURATION HAVING 20 CYLINDERS

(71) Applicant: Liebherr Machines Bulle SA, Bulle (CH)

(72) Inventor: Christoph Henninger, Lausanne (CH)

(73) Assignee: Liebherr Machines Bulle SA, Bulle (CH)

( * ) Notice: Subject to any disclaimer, the term of this patent is extended or adjusted under 35 U.S.C. 154(b) by 136 days.

(21) Appl. No.: 15/397,625

(22) Filed: Jan. 3, 2017

(65) Prior Publication Data

US 2017/0191410 A1    Jul. 6, 2017

(30) Foreign Application Priority Data

Jan. 4, 2016    (CH) ...................... 0006/16

(51) Int. Cl.
*F02B 75/22*    (2006.01)
*F02B 75/02*    (2006.01)
(Continued)

(52) U.S. Cl.
CPC .............. *F02B 75/22* (2013.01); *F02B 75/02* (2013.01); *F16C 3/06* (2013.01); *F16F 9/12* (2013.01);
(Continued)

(58) Field of Classification Search
CPC ...... F02B 2075/1864; F02B 2075/1868; F02B 75/22; F02B 75/228
(Continued)

(56) References Cited

U.S. PATENT DOCUMENTS

| 1,752,713 A | 4/1930 | Whatley |
| 2,034,585 A * | 3/1936 | Lipetz ...................... B61C 7/04 |
| | | 105/172 |

(Continued)

FOREIGN PATENT DOCUMENTS

| DE | 2615742 A1 | 10/1977 |
| EP | 1367238 A1 | 12/2003 |

(Continued)

OTHER PUBLICATIONS

Wilson, W., "Practical Solution of Torsional Vibration Problems: With Examples from Marine, Electrical, and Automobile Engineering Practice," Available as Early as Jan. 1, 1935, Chapman & Hall, Ltd., London, England, 227 pages.
(Continued)

*Primary Examiner* — Syed O Hasan
(74) *Attorney, Agent, or Firm* — McCoy Russell LLP

(57) ABSTRACT

The present disclosure relates to a four-stroke reciprocating piston engine in a V configuration having 20 cylinders, having a counter-clockwise direction of rotation, having an ignition timing control which fires the cylinders A1 to A10 and B1 to B10 in at least one of the following firing sequences, wherein the direction of rotation and the cylinder numbering are defined in accordance with DIN ISO 1204:
 a) A1-B3-A4-B9-A8-B5-A2-B1-A5-B4-A10-B8-A7-B2-A3-B6-A9-B10-A6-B7
 b) A1-B3-A4-B9-A8-B6-A2-B1-A5-B4-A10-B8-A7-B2-A3-B5-A9-B10-A6-B7
 c) A1-B2-A5-B8-A9-B4-A3-B1-A7-B6-A10-B9-A6-B3-A2-B7-A8-B10-A4-B5
 d) A1-B2-A5-B8-A9-B4-A3-B1-A7-B5-A10-B9-A6-B3-A2-B7-A8-B10-A4-B6
 e) A1-B2-A6-B8-A9-B4-A3-B1-A7-B6-A10-B9-A5-B3-A2-B7-A8-B10-A4-B5

(Continued)

f) A1-B2-A6-B8-A9-B4-A3-B1-A7-B5-A10-B9-A5-B3-A2-B7-A8-B10-A4-B6
g) A1-B3-A4-B9-A8-B5-A2-B1-A6-B4-A10-B8-A7-B2-A3-B6-A9-B10-A5-B7
h) A1-B3-A4-B9-A8-B6-A2-B1-A6-B4-A10-B8-A7-B2-A3-B5-A9-B10-A5-B7
i) A1-B2-A4-B8-A2-B6-A8-B10-A6-B7-A10-B9-A7-B3-A9-B5-A3-B1-A5-B4
j) A1-B4-A3-B9-A7-B5-A2-B1-A5-B3-A10-B7-A8-B2-A4-B6-A9-B10-A6-B8
k) A1-B4-A3-B9-A7-B6-A2-B1-A5-B3-A10-B7-A8-B2-A4-B5-A9-B10-A6-B8
l) A1-B4-A3-B9-A7-B5-A2-B1-A6-B3-A10-B7-A8-B2-A4-B6-A9-B10-A5-B8
m) A1-B4-A3-B9-A7-B6-A2-B1-A6-B3-A10-B7-A8-B2-A4-B5-A9-B10-A5-B8.

21 Claims, 11 Drawing Sheets

(51) Int. Cl.
F16C 3/06 (2006.01)
F16F 9/12 (2006.01)
F16F 15/30 (2006.01)
F02B 75/18 (2006.01)

(52) U.S. Cl.
CPC ........ *F16F 15/30* (2013.01); *F02B 2075/027* (2013.01); *F02B 2075/1868* (2013.01); *F16C 2204/60* (2013.01)

(58) Field of Classification Search
USPC ...................................... 123/54.4, 54.8, 55.7
See application file for complete search history.

(56) References Cited

U.S. PATENT DOCUMENTS

| | | | |
|---|---|---|---|
| 2,740,389 | A | 4/1956 | Reyl |
| 6,092,016 | A | 7/2000 | Sarangapani et al. |
| 6,675,639 | B1 | 1/2004 | Schricker et al. |
| 7,979,193 | B2* | 7/2011 | Harbert ............... F02D 41/0087 123/54.8 |
| 2005/0235942 | A1* | 10/2005 | McCullagh ............... F01B 1/12 123/184.34 |
| 2009/0099755 | A1 | 4/2009 | Harbert |
| 2015/0354471 | A1* | 12/2015 | Kopecek ................. F02P 5/145 123/406.2 |

FOREIGN PATENT DOCUMENTS

| | | |
|---|---|---|
| EP | 1793104 A1 | 6/2007 |
| EP | 2952712 A1 | 12/2015 |
| GB | 322161 A | 11/1929 |
| GB | 544804 A | 4/1942 |

OTHER PUBLICATIONS

Nestoriedes, E., "A Handbook on Torsional Vibration," Chapter 2, Part 2, Available as Early as Jan. 1, 1958, Cambridge at the University Press, London, England, 21 pages.
Ronnedal, P. et al., "Firing Order Selection in Relation to Vibration Aspects," Proceedings of the 2003 Spring Technical Conference of the ASME Internal Combustion Engine Division (ICES03), May 11, 2003, Salzburg, Austria, 11 pages.
Knorr, J. et al., "Firing Order Optimization Based on Integrated Simulation," MAN Nutzfahrzeuge AG Powerpoint Presentation, Available Online at https://www.gtisoft.com/wp-content/uploads/publication/MAN2010.pdf, Oct. 25, 2010, 22 pages.
Buczek, K. et al., "Firing Order Optimization in FEV Virtual Engine," Proceedings of the 2014 Torsional Vibration Symposium, May 23, 2014, Salzburg, Austria, 8 pages.
Henninger, C., "Firing Sequence Optimization for a V20 Cylinder Diesel Engine," Proceedings of the 2014 Torsional Vibration Symposium, May 23, 2014, Salzburg, Austria, 8 pages.
Priestner, C. et al., "Crank Train Torsional Vibration Optimization," Proceedings of the 2014 Torsional Vibration Symposium, May 23, 2014, Salzburg, Austria, 8 pages.
Henninger, C., "Firing Sequence Optimisation on a V20," MTZ Industrial Special Edition, vol. 4, No. 2, Sep. 2014, Published Online Aug. 23, 2014, 6 pages.
Stadelmann, M. et al., "Generalized Torsional Vibration Analysis of Generating Sets for Diesel-Electric Powertrains," Proceedings of SIMPEP Kongress 2014, Sep. 17, 2014, Germany, 13 pages.
Henninger, C. et al., "Four-Stroke Reciprocating Piston Engine in a V Configuration Having 16 Cylinders," U.S. Appl. No. 15/397,654, filed Jan. 3, 2017, 39 pages.

* cited by examiner

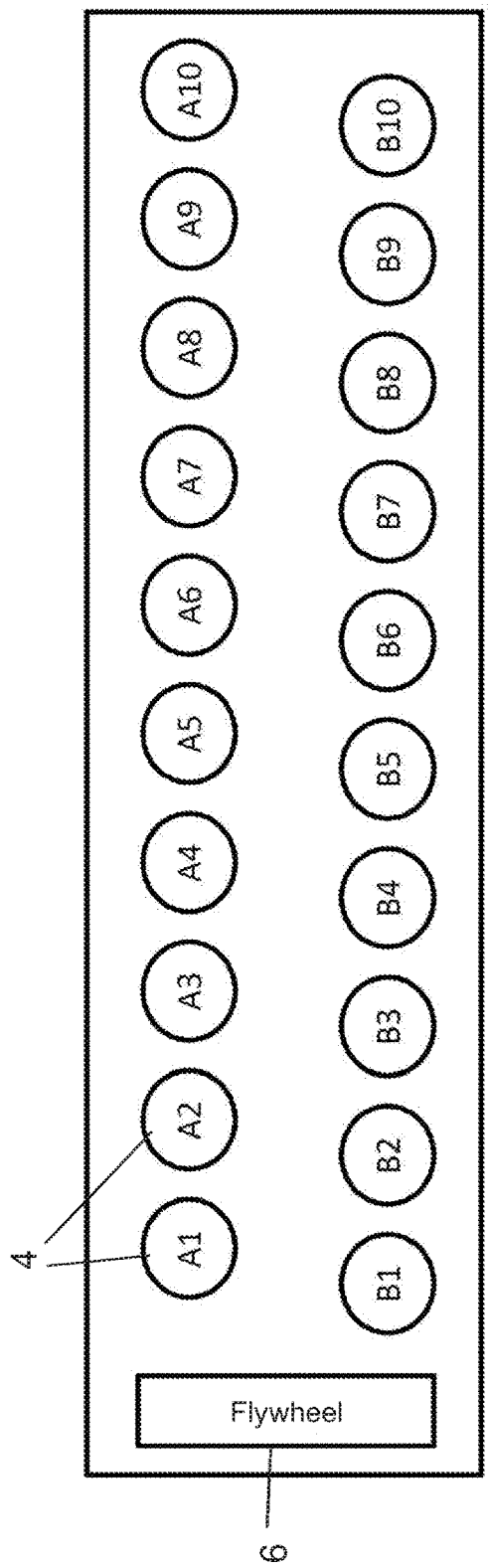

Fig. 10
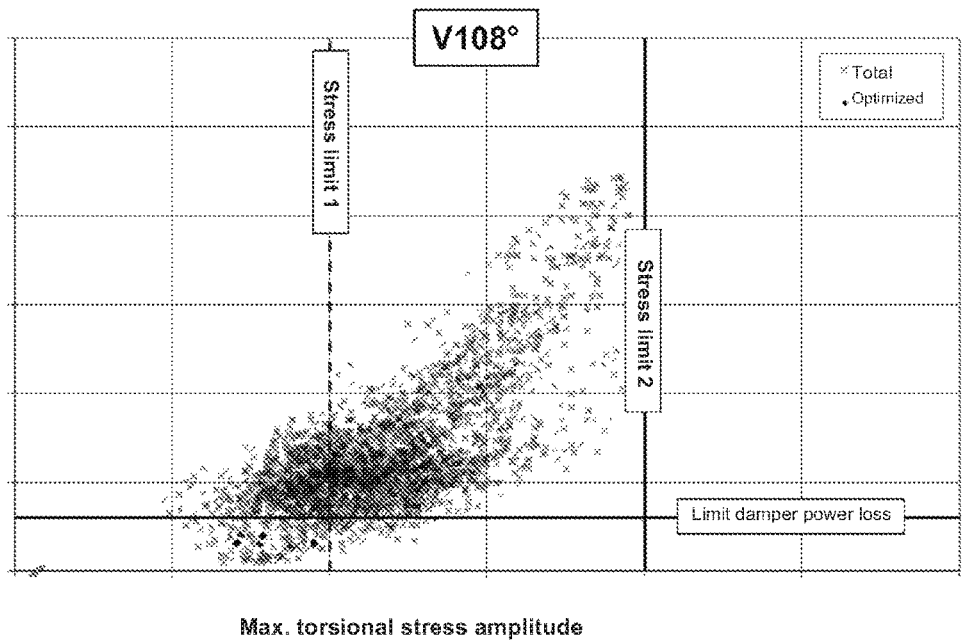
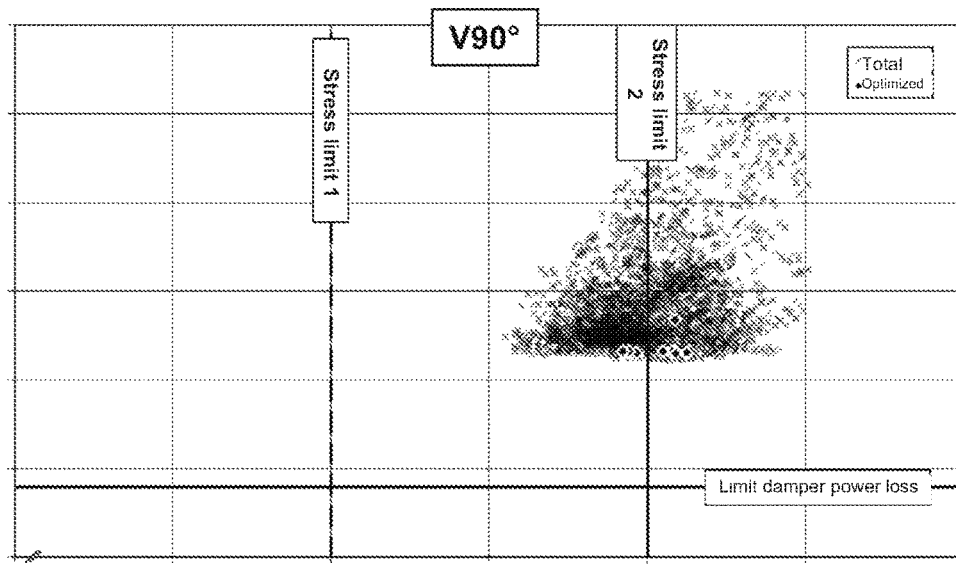

FOUR-STROKE RECIPROCATING PISTON ENGINE IN A V CONFIGURATION HAVING 20 CYLINDERS

CROSS REFERENCE TO RELATED APPLICATION

This application claims priority to Swiss Patent Application No. 00006/16 entitled "Four-stroke reciprocating piston engine in a V configuration having 20 cylinders," filed Jan. 4, 2016. The entire contents of which is hereby incorporated by reference in its entirety for all purposes.

TECHNICAL FIELD

The present disclosure relates to a four-stroke reciprocating piston engine in a V configuration having 20 cylinders. In four-stroke reciprocating piston engines in V configuration, the cylinders are arranged in two cylinder banks which are at a V angle to one another.

BACKGROUND AND SUMMARY

The selection of a suitable firing sequence and of a suitable crank star is of fundamental importance in the development of four-cylinder reciprocating piston engines since they decisively determine the mechanical and thermodynamic properties of the engine. The torsional dynamics of the crankshaft, which depend to a substantial extent on the firing sequence must be named in first place here [Wil1935; Nes1958]. In addition, further aspects have to be taken into account such as the gas exchange process, the load on the crankshaft bearings as well as engine operating vibrations. The number of possible firing sequences or possible crank configurations has already been largely described in the relevant literature for reciprocating piston engines having a small number of cylinders with up to six cylinders for reciprocating piston engines in an inline configuration or with up to 12 cylinders in the case of a V configuration, see e.g. [MaaKli1981]. As the number of cylinder increases, the number of possible combinations of firing sequences or crank stars grows disproportionately, however, while the vibration dynamics of the crankshaft and of the total reciprocating piston engine become much more complex at the same time. The selection of a suitable firing sequence for multi-cylinder reciprocating piston engines therefore requires a deep understanding of both the mechanics and the vibration dynamics as well as of the gas exchange process. The systematic evaluation today takes place more and more using computer-assisted simulation and optimizing methods [KnoMal2010, Hen2014a, Hen2014b, BucLau2014, PriOva2014].

There are already a number of patents on firing sequences. U.S. Pat. No. 2,740,389 in this respect deals with the effects of firing sequences on the air path in internal combustion engines having a plurality of cylinders. U.S. Pat. No. 7,979,193 deals with the firing sequences of a V12 reciprocating piston engine in a V 90° configuration. EP 1 793 104 B9 shows a number of advantageous firing sequences for a 15-cylinder reciprocating piston engine in an inline configuration. There is in contrast not yet any knowledge with respect to a V20 engine.

It is therefore the object of the present disclosure to provide a four-stroke reciprocating piston engine in a V configuration having 20 cylinders which has good properties with respect to the above-named factors.

In a first aspect, the present disclosure deals with optimized firing sequences for a four-stroke reciprocating piston engine in a V configuration having 20 cylinders. Since the optimum firing sequences depend on the direction of rotation of the four-stroke reciprocating piston engine, this first aspect comprises two variations.

In a first variant of the first aspect, the present disclosure comprises a four-stroke reciprocating piston engine in a V configuration having 20 cylinders with a counter-clockwise direction of rotation. The engine has an ignition timing control which ignites cylinders A1 to A10 and B1 to B10 in at least one of the following firing sequences, with the direction of rotation and the cylinder numbering being defined by DIN ISO 1204:

a) A1-B3-A4-B9-A8-B5-A2-B1-A5-B4-A10-B8-A7-B2-A3-B6-A9-B10-A6-B7 b) A1-B3-A4-B9-A8-B6-A2-B1-A5-B4-A10-B8-A7-B2-A3-B5-A9-B10-A6-B7 c) A1-B2-A5-B8-A9-B4-A3-B1-A7-B6-A10-B9-A6-B3-A2-B7-A8-B10-A4-B5 d) A1-B2-A5-B8-A9-B4-A3-B1-A7-B5-A10-B9-A6-B3-A2-B7-A8-B10-A4-B6 e) A1-B2-A6-B8-A9-B4-A3-B1-A7-B6-A10-B9-A5-B3-A2-B7-A8-B10-A4-B5 f) A1-B2-A6-B8-A9-B4-A3-B1-A7-B5-A10-B9-A5-B3-A2-B7-A8-B10-A4-B6 g) A1-B3-A4-B9-A8-B5-A2-B1-A6-B4-A10-B8-A7-B2-A3-B6-A9-B10-A5-B7 h) A1-B3-A4-B9-A8-B6-A2-B1-A6-B4-A10-B8-A7-B2-A3-B5-A9-B10-A5-B7.

The firing sequences (a) and (b) are particularly advantageous in this respect.

Advantages furthermore result with the following firing sequences for variants with a large moment of inertia at the output side:

i. A1-B2-A4-B8-A2-B6-A8-B10-A6-B7-A10-B9-A7-B3-A9-B5-A3-B1-A5-B4 j. A1-B4-A3-B9-A7-B5-A2-B1-A5-B3-A10-B7-A8-B2-A4-B6-A9-B10-A6-B8 k. A1-B4-A3-B9-A7-B6-A2-B1-A5-B3-A10-B7-A8-B2-A4-B5-A9-B10-A6-B8 l. A1-B4-A3-B9-A7-B5-A2-B1-A6-B3-A10-B7-A8-B2-A4-B6-A9-B10-A5-B8 m. A1-B4-A3-B9-A7-B6-A2-B1-A6-B3-A10-B7-A8-B2-A4-B5-A9-B10-A5-B8

In a second variant of the first aspect, the present disclosure comprises a four-stroke reciprocating piston engine in a V configuration having 20 cylinders with a clockwise direction of rotation. The engine has an ignition timing control which ignites cylinders A1 to A10 and B1 to B10 in at least one of the following firing sequences, with the direction of rotation and the cylinder numbering being defined by DIN ISO1204:

a. A1-B5-A4-B10-A8-B7-A2-B3-A6-B9-A10-B6-A7-B1-A3-B4-A9-B8-A5-B2 b. A1-B5-A4-B10-A8-B7-A2-B3-A5-B9-A10-B6-A7-B1-A3-B4-A9-B8-A6-B2 c. A1-B7-A6-B10-A9-B6-A3-B2-A7-B8-A10-B4-A5-B1-A2-B5-A8-B9-A4-B3 d. A1-B7-A5-B10-A9-B6-A3-B2-A7-B8-A10-B4-A6-B1-A2-B5-A8-B9-A4-B3 e. A1-B7-A6-B10-A9-B5-A3-B2-A7-B8-A10-B4-A5-B1-A2-B6-A8-B9-A4-B3 f. A1-B7-A5-B10-A9-B5-A3-B2-A7-B8-A10-B4-A6-B1-A2-B6-A8-B9-A4-B3 g. A1-B6-A4-B10-A8-B7-A2-B3-A6-B9-A10-B5-A7-B1-A3-B4-A9-B8-A5-B2 h. A1-B6-A4-B10-A8-B7-A2-B3-A5-B9-A10-B5-A7-B1-A3-B4-A9-B8-A6-B2.

The firing sequences (a) and (b) are particularly advantageous in this respect.

Advantages furthermore result with the following firing sequences for variants with a large moment of inertia at the output side:

i. A1-B5-A4-B1-A2-B4-A8-B2-A6-B8-A10-B6-A7-B10-A9-B7-A3-B9-A5-B3
   j. A1-B5-A3-B10-A7-B8-A2-B4-A6-B9-A10-B6-A8-B1-A4-B3-A9-B7-A5-B2
   k. A1-B5-A3-B10-A7-B8-A2-B4-A5-B9-A10-B6-A8-B1-A4-B3-A9-B7-A6-B2
   l. A1-B6-A3-B10-A7-B8-A2-B4-A6-B9-A10-B5-A8-B1-A4-B3-A9-B7-A5-B2
   m. A1-B6-A3-B10-A7-B8-A2-B4-A5-B9-A10-B5-A8-B1-A4-B3-A9-B7-A6-B2

The inventors of the present disclosure have in this respect recognized on the basis of a computer-assisted simulation and optimizing method and by a systematic evaluation of the mechanics, vibration dynamics and gas exchange process relevant to the selection of a suitable firing sequence for V20 reciprocating piston engines that the firing sequences claimed in accordance with the present disclosure for four-stroke reciprocating piston engines in a V configuration having 20 cylinders have particularly advantageous properties with respect to torsional vibrations of the crankshaft, the gas exchange process, the load on the crankshaft bearings and the operating vibrations.

The fatigue strength and thus the service life of the engine are increased by the reduced load on the crankshaft and on the crankshaft bearing as well as by the reduction in operating vibrations. The construction effort for the engine and the connection to further components can furthermore be reduced. The small torsion load on the crankshaft due to the optimized firing sequences can furthermore make it possible to make use of inexpensive crankshaft materials. The reduction in the torsional vibrations can furthermore permit the use of a compact torsional vibration damper of a simple design. Both represent a substantial cost advantage in mass production. The engines in accordance with the present disclosure can in this respect be used for the most varied areas of use.

In a second aspect of the present disclosure which can also be used independently of the first aspect, the present disclosure deals with the configuration of the crank star of the four-stroke reciprocating piston engine, i.e. with the order of the cranks along the crankshaft.

The present disclosure therefore comprises in a second aspect a four-stroke reciprocating piston engine in a V configuration having 20 cylinders, wherein the direction of rotation can be directed both counter-clockwise and clockwise. The engine has a crankshaft and a flywheel arranged on the crankshaft. The crankshaft has cranks at which the connecting rods of the cylinders engage, with the connecting rods of a V segment of the four-stroke reciprocating piston engine each engaging at a common crank. The cranks of the crankshaft in this respect form a so-called crank star. The crank star in accordance with the present disclosure is of a centrally symmetrical or quasi-centrally symmetrical design, with the cranks having one of the following sequences in the direction of rotation viewed from the flywheel side. In this respect, the cranks are numbered in order from C1 to C10 starting from the flywheel side:

i) C1,10-C5,6-C2,9-C3,8-C4,7
   ii) C1,10-C4,7-C3,8-C2,9-C5,6
   iii) C1,10-C5,6-C3,8-C2,9-C4,7
   iv) C1,10-C5,6-C2,9-C4,7-C3,8.

In this respect, the above-named number pairs, i.e. e.g. C1,10, are each the respective crank pairs on the two halves of the crankshaft arranged due to the centrally symmetrical or quasi-centrally symmetrical arrangement with the same angular range or in a similar angular range. In other words, the cranks have one of the following sequences in the direction of rotation, viewed from the flywheel side, for the cranks C1 to C5 disposed between the flywheel and the crankshaft center:

i) C1-C5-C2-C3-C4
   ii) C1-C4-C3-C2-C5
   iii) C1-C5-C3-C2-C4
   iv) C1-C5-C2-C4-C3.

The cranks C5 to C10 on the crankshaft half remote from the flywheel are arranged symmetrically or quasi-symmetrically with respect to the cranks on the crankshaft half facing the flywheel and accordingly have one of the following sequences in the direction of rotation, viewed from the flywheel side:

i) C10-C6-C9-C8-C7
   ii) C10-C7-C8-C9-C6
   iii) C10-C6-C8-C9-C7
   iv) C10-C6-C9-C7-C8.

The inventors of the present disclosure have taken into account in this respect that the design of the crank star and in particular the order of the individual cranks along the crankshaft also have a substantial influence on the vibration dynamics of the crankshaft and of the engine. The symmetrical or quasi-symmetrical arrangement of the cranks has the advantage in this respect that no free mass forces and mass torques occur during operation, or at least only small free mass forces and mass torques. The specific sequences of the cranks for such a centrally symmetrical or quasi-centrally symmetrical crank star were then optimized with regard to further properties. The inventors have in this respect determined, on the basis of a computer-assisted simulation and optimizing method and by a systematic evaluation of the mechanics and vibration dynamics relevant to the selection of a suitable crank star, those crank stars which have particularly good properties with respect to the vibration properties.

The optimized firing sequences in accordance with the first aspect and the optimized crank stars in accordance with the second aspect are in this respect protected independently of one another as subjects of the present disclosure.

A combination of the first and second aspects particularly takes place, however. In this respect, four-stroke reciprocating piston engines are optionally operated with a crank star configured in accordance with the second aspect and with a firing sequence in accordance with the first aspect.

One of the following combinations of crank star and firing sequence is particularly used in this respect:
   Crank star i), one of the firing sequences a, b, g h
   Crank star ii), one of the firing sequences c-f
   Crank star iii), the firing sequence i
   Crank star iv), one of the firing sequences j-m.

The inventors of the present disclosure have recognized in this respect that particularly good results can be achieved by such a coordination of crank stars and firing sequence.

In a third aspect, the present disclosure deals with the V angle of the reciprocating piston engine in V20 configuration.

The present disclosure therefore comprises in a third aspect a four-stroke reciprocating piston engine in V configuration having 20 cylinders, with a clockwise or counter-clockwise direction of rotation, with the V angle in accordance with the present disclosure amounting to between 101° and 115°.

Only V20 engines having a V angle of 60° or 90° were in this respect known from the prior art. In this respect, the V angle was simply taken over from engines of the same type with a smaller number of cylinders. The inventors of the present disclosure have recognized that the previously used V angles are, however, not ideal for a V20 engine. In this respect, the inventors of the present disclosure have recognized that a four-stroke reciprocating piston engine having a V angle has substantially better properties with respect to the vibration dynamics and smooth operation in the claimed range.

The V angle in this respect may amount to between 103° and 113°, further optionally between 106° and 110°, and further optionally between 107° and 109°. The optimum value in accordance with the studies of the inventors is at 108°. The effects in accordance with the present disclosure can, however, also be utilized in the claimed angular range around this ideal value.

The four-stroke reciprocating piston engine in accordance with the fourth aspect optionally has a centrally symmetrical or quasi-centrally symmetrical crank star. The V angle range in accordance with the present disclosure has particularly favorable properties for the use of such a centrally symmetrical or quasi-centrally symmetrical crank star. The symmetrical or quasi-symmetrical arrangement of the cranks has the advantage in this respect that no free mass forces and mass torques occur during operation, or at least only small free mass forces and mass torques.

The third aspect of the present disclosure can also be used independently of the first or second aspects. The V20 engine in accordance with the present disclosure in accordance with the third aspect is in particular not restricted to the firing sequences indicated in accordance with the first aspect or to the crank stars indicated in accordance with the second aspect, but can rather also be used with other firing sequences and other crank stars.

A four-stroke reciprocating piston engine in accordance with the third aspect, however, optionally has a centrally symmetrically or quasi-centrally symmetrically designed crank star in accordance with the second aspect. The four-stroke reciprocating piston engine in accordance with the third aspect is further optionally operated with the firing sequences in accordance with the first aspect.

However, the firing sequences or crank stars shown in accordance with the first or second aspect are also not restricted to the use in a V20 engine having a V angle in the V angular range claimed in accordance with the third aspect.

The V angle of a four-stroke reciprocating piston engine in accordance with the first or second aspect can in this respect be between 72° and 144° within the framework of the present disclosure. The inventors of the present disclosure have recognized in this respect that the V angle also has an influence on the above-named aspects to be optimized and that there is a certain interaction between the firing sequences or the crank stars and the V angle.

The V angle in the engines in accordance with the first or second aspects in this respect optionally amounts to between 88° and 128°, further optionally between 93° and 122°.

The firing sequences in accordance with the present disclosure in accordance with the first aspect or crank stars in accordance with the second aspect are particularly used in a four-stroke reciprocating piston engine in accordance with the third aspect. All three aspects are in this respect optionally combined with one another in a four-stroke reciprocating piston engine.

Preferred embodiments of the present disclosure which can be used both with a four-stroke reciprocating piston engine in accordance with the first aspect, in accordance with the second aspect or in accordance with the third aspect and with any combination of these aspects will be explained in more detail in the following.

The firing sequences of an engine in accordance with the present disclosure optionally have an equidistant or quasi-equidistant firing sequence. In this respect, quasi-equidistant means that the firing sequence is admittedly substantially equidistant, but certain deviations from an equidistant angular ignition spacing are permitted. The firing interval between two consecutive firings in this respect optionally amounts to between 31° and 41°, further optionally between 33° and 39°, and further optionally between 35° and 37°, in an equidistant or quasi-equidistant embodiment in accordance with the present disclosure. The firing interval between two consecutive ignitions furthermore optionally amounts to 36° so that an equidistant firing interval is present. The equidistant firing interval of 36° in this respect results from the fact that each of the twenty cylinders fires once as part of two revolutions of the four-stroke reciprocating piston engine.

The crankshaft furthermore optionally has ten cranks at which the connecting rods of the cylinders engage, with the connecting rods of a V segment of the four-stroke reciprocating piston engine each engaging at a common crank. The cranks in this respect form a crank star. Such a configuration of the crankshaft is of advantage from a technical manufacturing aspect in this respect.

The crank star is in this respect optionally of a centrally symmetrical or quasi-centrally symmetrical design, i.e. the cranks are arranged symmetrically or quasi-symmetrically along the crankshaft with respect to the crankshaft center. This provides the advantage that no mass forces and mass torques, or only small mass forces and mass torques, occur in operation. In this respect, the angle between two cranks which have the same spacing from the crankshaft center optionally amounts to less than 5° in the centrally symmetrical or quasi-centrally symmetrical design in accordance with the present disclosure. The angular spacing is optionally less than 3°, further optionally less than 1°. A completely centrally symmetrical arrangement is particularly preferred.

The cranks on both crankshaft halves are further optionally each distributed equidistantly or quasi-equidistantly. A quasi-equidistant distribution in this respect means that the distribution is substantially equidistant, but certain deviations from an equidistant distribution are permitted. The angular spacing between cranks following one another at an angle in this respect optionally amounts to between 67° and 77°, further optionally between 69° and 75°, further optionally between 71° and 73° on both crankshaft halves, with the equidistant or quasi-distant distribution in accordance with the present disclosure. The angular spacing particularly amounts to 72° in this respect so that equidistance is present. In accordance with the present disclosure, the cranks are thus distributed evenly or substantially evenly over the angular range of 360° on both crankshaft halves.

The four-stroke reciprocating piston engine in accordance with the present disclosure optionally has a torsional vibration damper which damps the torsional vibrations of the crankshaft. The torsional vibrations are reduced by the embodiment of the four-stroke reciprocating piston engine in accordance with the present disclosure so that the required power loss of the torsional vibration damper can be reduced with respect to known four-stroke reciprocating piston engines. The power loss of the torsional vibration damper in this respect optionally amounts to less than 6‰ of the maximum engine power; further optionally to less than 5‰; further optionally to less than 3.5‰; further optionally to less than 2.5‰, further optionally to less than 2‰, further optionally to less than 1.5‰ of the maximum engine power. It is additionally possible due to the required power loss of the torsional vibration damper reduced in accordance with the present disclosure to use favorable and technically less complex vibration dampers.

In accordance with the present disclosure, a viscous oil torsional vibration damper can in particular be used in this respect. This is substantially less expensive in comparison with spring leaf dampers. The use of a spring leaf damper is, however, naturally equally possible in accordance with the present disclosure depending on the application purpose.

The four-stroke reciprocating piston engine in accordance with the present disclosure has a crankshaft and a flywheel arranged on the crankshaft. The power take-off in this respect takes place at the side of the flywheel which is typically connected directly or via a coupling to a shaft which drives a consumer. In this respect, the torsional vibration damper is optionally arranged at the free side of the crankshaft disposed opposite the flywheel. The torsional vibration damper is in this respect particularly arranged outside the engine casing.

The loads reduced in accordance with the present disclosure can make it possible in dependence on the application to produce the crankshaft from a less expensive steel. The crankshaft is in this respect optionally produced from ferritic-pearlitic steel with precipitation hardening from hot working. Such crankshafts are already known from the automotive sector in which the engines, however, are exposed to substantially smaller loads or have to have a substantially smaller service life. The use of such a less expensive steel instead of the otherwise typical heat-treatable steel likewise becomes possible for the V20 engines in accordance with the present disclosure due to the present disclosure.

Four-stroke reciprocating piston engines in accordance with the present disclosure can be used in a plurality of different configurations and dimensions.

In a possible embodiment of the present disclosure, the displacement per cylinder amounts to between 1 l and 10 l, optionally between 1.5 l and 5 l, further optionally between 2 l and 3 l.

The maximum power of the engine per liter displacement further optionally amounts to between 10 kW and 80 kW, further optionally between 20 kW and 60 kW.

The engine can furthermore be operable in a speed range which is between 400 and 3000 r.p.m. The engine can in this respect in particular be operable in a speed range between 600 and 2100 r.p.m. The speed range of a specific four-stroke reciprocating piston engine in accordance with the present disclosure actually used for an application can in this respect make up a part range of this speed range.

The engine optionally has an engine speed control which operates the engine at a desired engine speed. The engine is optionally controlled in this respect such that the engine again reaches the desired engine speed after brief load changes which allow the actual engine speed to deviate from the desired engine speed. In a possible embodiment, the desired engine speed can be kept constant in this respect. The desired engine speed is in this respect in particular constant over time periods which are long with respect to the typical load changes. In accordance with the present disclosure, the engine control can, however, be designed such that the desired engine speed can be adapted to changing engine conditions and/or load conditions. The desired engine speed can in this respect in particular be tracked slowly for the adaptation.

The engine in accordance with the present disclosure can, however, also be operated using any desired other engine control principles.

The design of the four-stroke reciprocating piston engine in accordance with the present disclosure can be combined with a plurality of different design embodiments of the engine.

The engine in accordance with the present disclosure optionally has separate intake guides and/or exhaust guides for the two cylinder banks. The engine can furthermore have separate intake and/or exhaust systems for the two cylinder banks.

The engine in accordance with the present disclosure can be a gas engine. In this case, the engine is operable with a gaseous fuel such as hydrogen, natural gas, biogas and/or liquefied gas.

Alternatively or additionally, the engine can also be operable with a liquid fuel. The engine can in this respect, for example, be operable with diesel and/or gasoline.

In a possible embodiment, the engine in accordance with the present disclosure can in this respect only be operable with a gaseous fuel or only with a liquid fuel. Alternatively, however, an operation with both a gaseous fuel and with a liquid fuel is also conceivable.

The engine in accordance with the present disclosure can have direct injection. The engine can furthermore have high-pressure injection. These injections are particularly used with an engine which is operable with liquid fuel.

The engine in accordance with the present disclosure can be operable with a diesel combustion engine or with a gasoline combustion engine.

The engine control can furthermore be configured such that the engine works with a homogeneous-charge, stratified-charge and/or an alternative combustion method. In this respect, one or more combustion methods can also optionally be used in dependence on the engine conditions and/or load conditions.

The engine in accordance with the present disclosure can be a naturally aspirated engine. Alternatively, the engine can have a single-stage or multi-stage supercharging. The engine can in this respect in particular have one or more turbochargers and/or compressors.

A four-stroke reciprocating piston engine in accordance with the present disclosure can be used in a plurality of different applications. Some preferred applications will be described in more detail in the following:

The engine in accordance with the present disclosure can be used as a drive in a heavy-duty machine and/or in mining machinery. A use is furthermore conceivable in an earth-moving machine and/or a transport machine and/or a transfer machine. In a possible application, the engine can in this respect drive a generator or a hydraulic pump via which an undercarriage and/or pieces of working equipment of the heavy duty machine and/or mining machinery and/or earth-moving machine and/or transport machine and/or transfer machine are driven. The engine can alternatively drive an undercarriage and/or pieces of working equipment of the heavy duty machine and/or mining machinery and/or earth-moving machine and/or transport machine and/or transfer machine directly or via a transmission which is optionally connected to the engine by means of a mechanical clutch and/or a torque converter.

The use is in this respect conceivable both for mining machinery for underground mining and for mining machinery for strip mining. The heavy duty machine and/or mining machinery can be both a stationary machine and a mobile machine. If it is a mobile machine, at least the undercarriage is optionally driven by the engine in accordance with the present disclosure.

Possible areas of use of an engine in accordance with the present disclosure are in this respect in particular as a drive for a dump truck or excavator.

A further application of the engine in accordance with the present disclosure is as the main drive for a ship. The crankshaft optionally drives the propeller of the ship in this respect. The shaft of the propeller can in this respect be connected to the flywheel of the engine directly or via a clutch and/or a transmission.

A further area of application of the engine in accordance with the present disclosure is as the main drive in heavy military applications. The engine can in this respect in particular be used in an armored vehicle and/or in a rocket carrier and/or in a speedboat and/or in a submarine.

The engine in accordance with the present disclosure can furthermore be used as a main drive in a rail vehicle. The rail vehicle can in particular be operated diesel electrically in this respect. Alternatively, the drive can take place via a transmission which is further optionally connected to the engine by means of a clutch and/or a torque converter.

The engine in accordance with the present disclosure can furthermore be used as a drive in fluid-conveying technology and/or in the oil and gas industry. For example, the engine can in this respect be used as the drive of a pump and/or of an oil and/or gas extraction machine, of an oil and/or gas transporting machine and/or of an oil and/or gas processing machine.

The engine in accordance with the present disclosure can be used for stationary or mobile power generation.

In a possible application, the load can be connected to the crankshaft in a torsionally rigid manner. Alternatively, the load can, however, also be connected to the crankshaft via a torsionally flexible coupling. Such a torsionally flexible coupling absorbs torsional vibrations to a certain extent in this respect and thus reduces the transmission of still present torsional vibrations of the crankshaft to the driven load.

The present disclosure thus in particular protects the use of a four-stroke reciprocating piston engine in accordance with the present disclosure for one of the above-named applications.

The present disclosure furthermore comprises a machine having a four-stroke reciprocating piston engine in accordance with the present disclosure. The four-stroke reciprocating piston engine is in this respect in particular used to drive the machine or a piece of working equipment of the machine. The machine in accordance with the present disclosure can in this respect both be a stationary machine and a mobile machine.

The machine in accordance with the present disclosure is in particular one of the above-named applications. The machine in accordance with the present disclosure can, for example be a heavy duty machine and/or mining machinery and/or an earth-moving machine and/or a transport machine and/or a transfer machine, a ship a rail vehicle, a heavy military machine, a fluid-conveying machine, an oil and/or gas extraction machine, an oil and/or gas transport machine and/or an oil and/or gas processing machine and/or a power generation unit. The machine can in this respect in particular be configured such as was presented in more detail above with respect to the applications in accordance with the present disclosure. The engine in accordance with the present disclosure can be configured such as was presented in more detail above.

The present disclosure furthermore comprises an ignition timing control or software for an ignition timing control for a four-stroke reciprocating piston engine having 20 cylinders. The ignition timing control or the software in this respect implement at least one of the firing sequences indicated above with respect to the first aspect. The ignition timing control can in this respect be an ignition timing control predefined by the construction design of the engine, for example an ignition timing control driven mechanically via a camshaft. Alternatively, however, it can also be an electronically controlled ignition timing control. The ignition timing control or the software in this respect optionally implements an operation of the four-stroke reciprocating piston engine such as was presented in more detail above and/or can be used in a four-stroke reciprocating piston engine which is configured and/or operated such as was presented in more detail above.

The ignition timing control may be an ignition timing controller. The controller may comprise a microprocessor and a memory, the microcontroller executing a program installed in the memory. The controller and/or microprocessor may be adapted to electronically control components of the engine in such a way as to implement one or more of the firing sequences of the present invention. In particular, the controller and/or microprocessor may control electronically controlled fuel injectors and/or valves of the engine in response to sensors such as a crankshaft position sensor.

The present disclosure furthermore comprises a method of operating a four-stroke reciprocating piston engine in a V configuration having 20 cylinders, wherein the cylinders are operated with one of the firing sequences indicated in more detail above with respect to the first aspect. The four-stroke reciprocating piston engine is in this respect optionally configured and/or is operated such as was presented in more detail above.

The present disclosure will now be presented in more detail with reference to embodiments and to drawings.

BRIEF DESCRIPTION OF THE FIGURES

FIG. 3 shows a representation of the cylinder numbering in accordance with DIN ISO 1204, with the engine being shown in a plan view with overhead cylinders and a crankshaft arranged beneath the cylinders.

FIG. 10 shows top, the diagram already shown in FIG. 8 prepared for an engine having a V angle of 108°; and bottom, the same diagram for an engine having a V angle of 90°.

DETAILED DESCRIPTION

Figure 1:
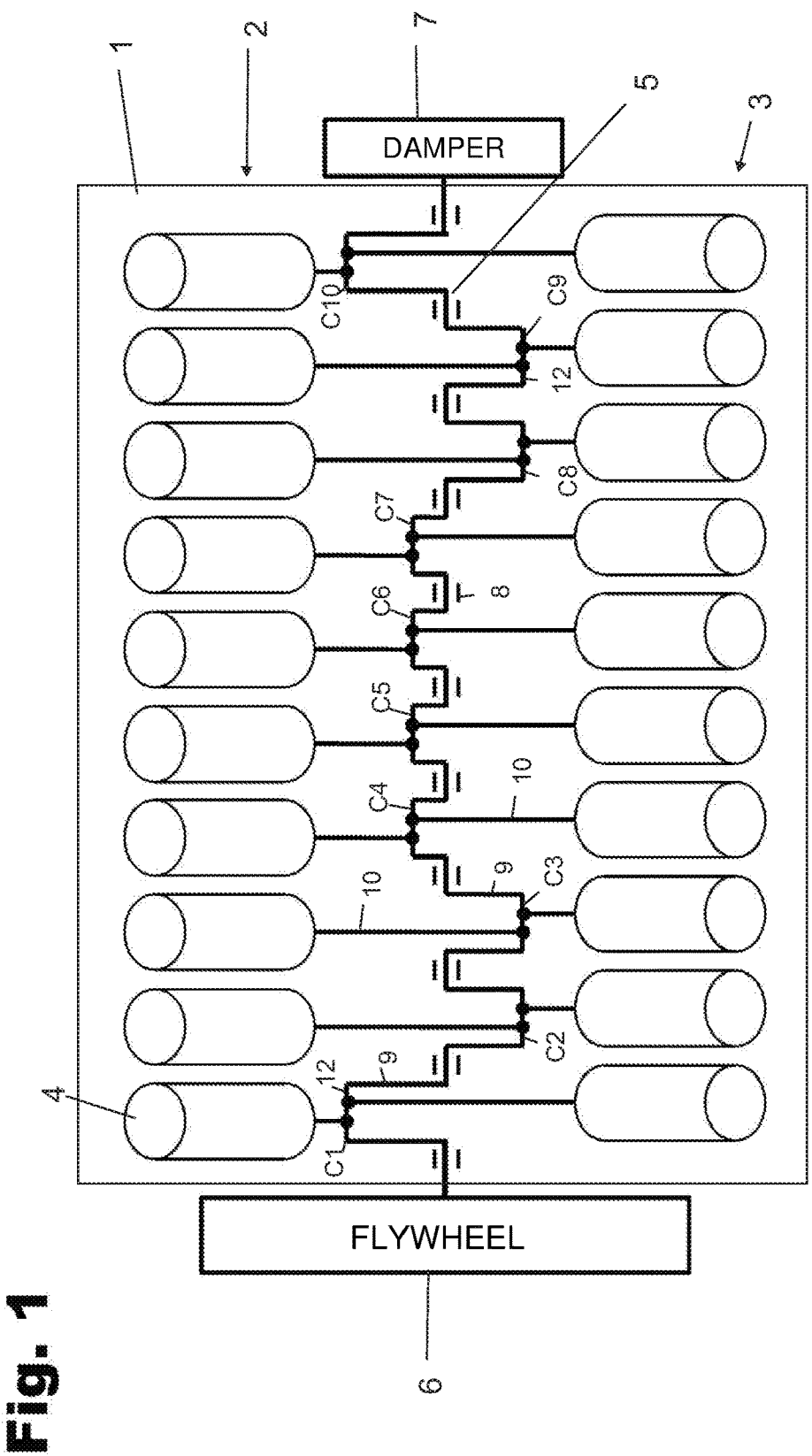
FIG. 1 shows a schematic diagram of a four-stroke reciprocating piston engine in accordance with the present disclosure.
Figure 2:
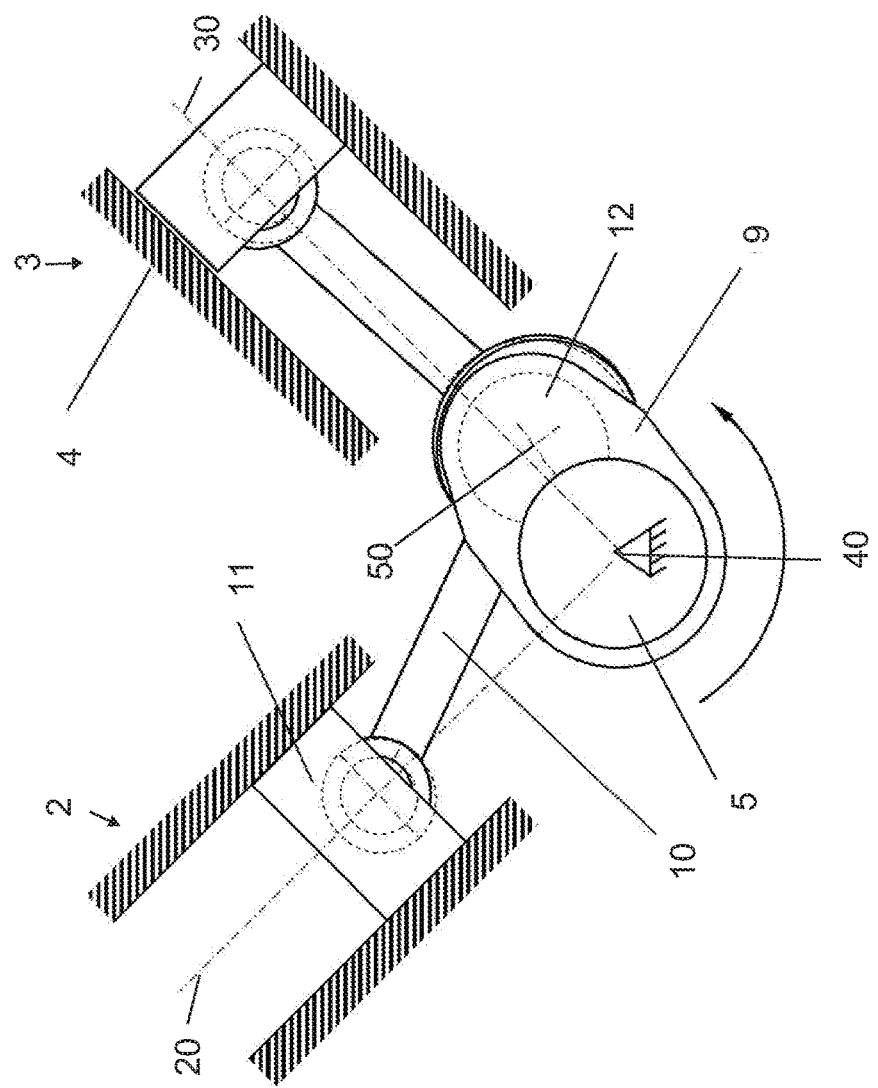
FIG. 2 shows a schematic diagram of a V segment of a four-stroke reciprocating piston engine in accordance with the present disclosure.

The design of a four-stroke reciprocating piston engine having 20 cylinders in accordance with the present disclosure is shown schematically in FIGS. 1 to 3.

FIG. 1 in this respect schematically shows the casing 1 of the engine in which the cylinders 4 of the engine are arranged. The crankshaft 5 driven by the cylinders is supported via bearing points 8. In accordance with the V configuration, the cylinders 4 of the engine are arranged in two lines, the so-called cylinder banks 2 and 3.

All cylinders are aligned in parallel with one another within the respective cylinder banks 2 and 3. As can be seen from FIG. 2, the main axes 20 of the cylinders of the first cylinder bank 2 and the main axes 30 of the cylinders of the second cylinder bank 3 are at a V angle a with respect to one another. In the schematic diagram shown in FIG. 2, the center 40 of the crankshaft 5 extends at the point of intersection of the main axes 20 and 30. Alternatively, the center 40 is laterally offset with respect to the plane of symmetry.

The crankshaft in this respect has cranks 9 which form a crank star. The cranks 9 in this respect each have crank pins 12 at which the connecting rods of at least one cylinder engages. It is the task of the individual crankshafts to convert the force applied to the pistons by the gas pressure into a torque which is transmitted as the effective torque via the crankshaft and the flywheel 6 to the power take-off. In modern V engines, the cranks of a V segment typically act on the same crank pins. In the embodiment, the connecting rods 10 of oppositely disposed cylinders, i.e. the connecting rods of a V segment of the V engine, therefore each engage at a common crank or at the crank pin of a common crank. The crank pin can in this respect also be split into two to achieve a certain angular offset.

The crankshaft is supported between two V segments and thus between two consecutive cranks via bearings 8 at the engine casing. The respective crank pins 12 are arranged eccentrically to the axis of rotation 40 of the crankshaft due to the cranks 9 so that the linear movement of the pistons 11 in the cylinders 4 is converted into a rotational movement of the crankshaft 5.

As shown in FIG. 1, the flywheel 6 is arranged at the one end of the crankshaft; a torsional vibration damper 7 is typically arranged at the other free end. The torsional vibration damper 7 can in this respect be a rubber damper or a leaf spring damper in a possible embodiment. A viscous oil torsional vibration damper is, however, preferred.

The torsional vibration damper 7 is arranged outside the casing 1 in the embodiment. The torsional vibration damper may be a viscous oil torsional vibration damper. The damper can in particular hereby be cooled by the environmental air. An arrangement of the damper within the casing of the engine is likewise conceivable, in particular when the damper is to be cooled via the engine lubricant. The flywheel 6 is likewise arranged outside the casing 1.

The engine's power take-off is typically carried out at the flywheel 6. The flywheel is in this respect as a rule in particular screwed via a coupling to a shaft which drives a load driven by the engine. Internal engine outputs can be provided at the free end of the crankshaft disposed opposite the flywheel, for example a wheel drive or belt drive to drive a water pump and/or an oil pump etc. In addition, however, power can also be taken for the application at the front crankshaft end.

The nomenclature used in accordance with the present disclosure to designate the individual cranks 9 is drawn in FIG. 1, according to which the cranks are numbered in order starting from the flywheel side by C1 to C10. The numbering of the individual cylinders in accordance with DIN ISO 1204 is reproduced in FIG. 3, as is used in the present case to designate the firing sequences. The drawing in this respect shows the four-stroke reciprocating piston engine in a plan view from above, with the flywheel 6 and the cylinders 4 being drawn. The crankshaft is in this case located beneath the cylinders. The direction of rotation is in this respect defined in the present case in accordance with DIN ISO 1204 in a view from the power output side of the engine to the crankshaft, i.e. looking from the flywheel side of the engine to the crankshaft.

In accordance with the present disclosure, optimized firing sequences for the cylinders of a reciprocating piston engine in accordance with the present disclosure were determined in this respect. Reference is in this respect made to the preceding representation with regard to the specific firing sequences. The nomenclature used in FIG. 3 in accordance with DIN ISO 1204 was in this respect used to designate the cylinders.

Figure 4A:
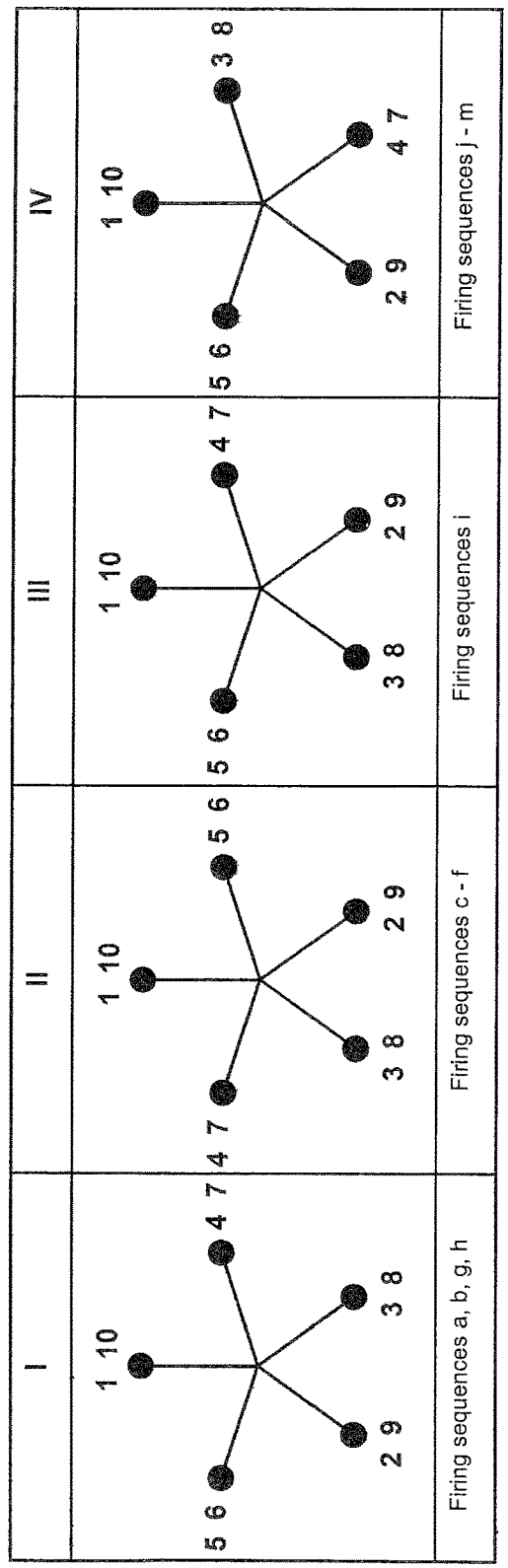
FIG. 4A shows crank stars in accordance with the present disclosure for a four-stroke reciprocating piston engine with a clockwise direction of rotation in a representation looking from the flywheel side to the crankshaft, with the numbering of the cranks on the flywheel side starting at 1, as well as preferred firing sequences with respect to these crank stars.
Figure 4B:
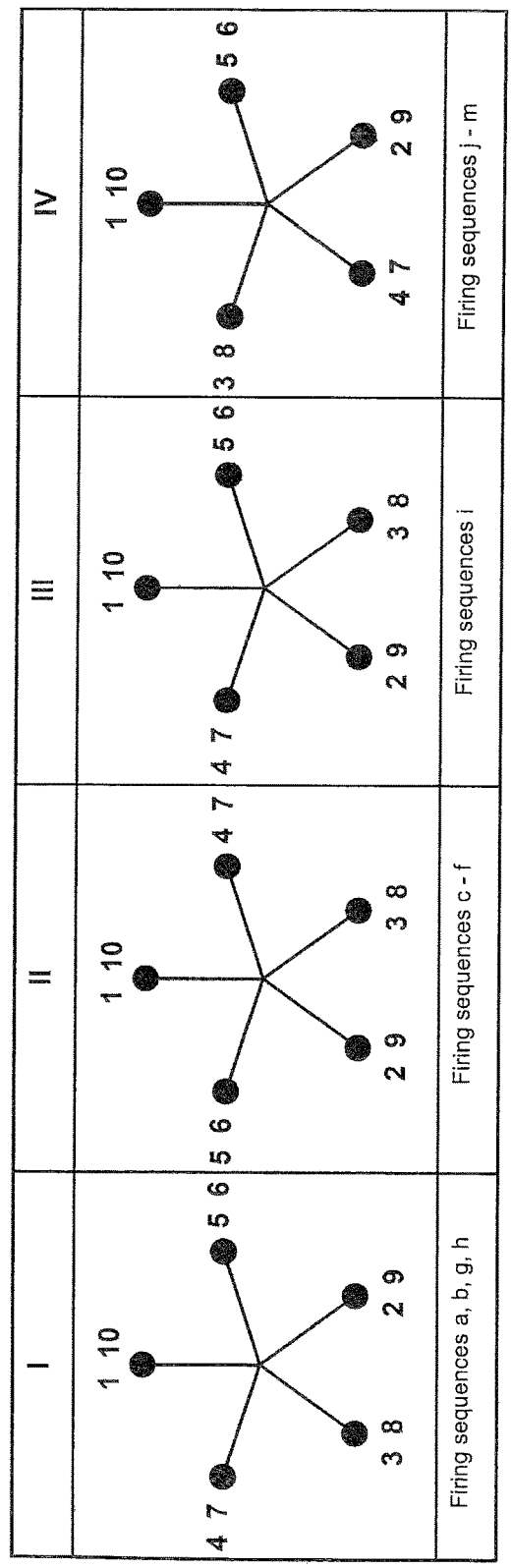
FIG. 4B shows crank stars in accordance with the present disclosure for a four-stroke reciprocating piston engine with a counter-clockwise direction of rotation in a representation looking from the flywheel side to the crankshaft, with the numbering of the cranks on the flywheel side starting at 1, as well as preferred firing sequences with respect to these crank stars.

The optimized crank stars selected in accordance with the present disclosure which have likewise already been described are shown in more detail in FIG. 4A for engines with a counter-clockwise direction of rotation and in FIG. 4B for engines with a clockwise direction of rotation. The crank stars for the engines having the two different directions of rotation have the same sequence of cranks in this respect with regard to the direction of rotation. In this respect, the view from the flywheel side onto the crankshaft along the crankshaft axis is respectively shown in the Figures. The cranks are furthermore indicated in accordance with the nomenclature shown in FIG. 1, with here only the letter "C" having been omitted and the cranks having been numbered in order starting at 1 on the flywheel side, i.e. the cranks 1 to 10 shown in FIGS. 4A and 4 B correspond to the cranks C1 to C10.

The crank stars in the embodiment are so-called centrally symmetrical crank stars, i.e. the cranks are arranged symmetrically with respect to the center of the crankshaft. As shown in FIG. 1 and in FIGS. 4A and 4 B, cranks having the same spacing from the center therefore each have the same angular arrangement. This is expressed in FIGS. 4A and 4 B in that two cranks are indicated at each of the five angular positions which have these angular positions. The present disclosure is, however, not restricted to such a centrally symmetrical arrangement. The arrangement is, however, optionally at least quasi-centrally symmetrical. The cranks within each crankshaft half are arranged equidistantly and therefore have an angular spacing of 72° in the embodiment. Certain deviations from such an equidistant arrangement are, however, also conceivable here. The present disclosure is, however, not restricted to such an equidistant arrangement. The arrangement is, however, optionally at least quasi-equidistant.

It will now be described in more detail in the following how the parameters of the four-stroke reciprocating piston engine in accordance with the present disclosure and in particular the firing sequences, the crank stars and the V angle were determined. In this respect, in the embodiment, a combination of the first, second and third aspects of the present disclosure is present.

Fundamental Aspects of the Optimization.

In reciprocating piston engines, the crankshaft is subject to different loads. The bending load of the individual cranks must be named first which arises through the cylinder pressure and the accelerated masses of the individual crank. In addition, the crankshaft is subject to a time-variable torsional load which results from the torques of the individual crank trains. In addition to these quasi-static types of load, torsional vibrations are excited in the crankshaft by the transient development of the torques of the individual crank trains and said torsional vibrations can exceed the quasi-static torsional load by a multiple.

In addition to various torsionally dynamic criteria, still further aspects are to be taken into account in the selection of the V angle, of the crank star and of a suitable firing sequence. The mass balancing of the crank train, the gas exchange process, the load on the crankshaft bearings and the operating vibrations of the total reciprocating piston engine must be named here. For common crank train configurations such as inline six-cylinder engines or V12 reciprocating piston engines, the number of possible crank stars and firing sequences is still relatively clear and the firing sequences which can be meaningfully implemented are comprehensively described in the literature. The number of possible firing sequences generally increases, however, highly disproportionately to the number of cylinders, which makes the selection of an advantageous solution substantially more difficult. The number of possible firing sequence combinations is already in the order of magnitude of $10^5$ for the four-stroke reciprocating piston engines dealt with here. In addition the use of optimization algorithms is made more difficult in that the optimization parameter firing sequence is of a discrete nature and the correlation between the firing sequence and some evaluation criteria such as bearing load and gas exchange process has large discontinuities.

The number of criteria to be considered in combination with the large number of possible firing sequences requires the use of methods of multi-criteria optimization. The discrete and partially discontinuous nature of the optimization problem in this respect prevents the use of purely deterministic optimization algorithms. A comprehensive evaluation can, in contrast, be achieved by a complete assessment of the criteria for all solutions ("design of experiments"). The calculation effort can in this respect be reduced to a reasonable level by a hierarchical optimization approach.

V Angle and Fundamental Crankshaft Topology.

Different aspects play a role in the selection of the V angle of crank trains. First, the V angle decisively determines the height and the width of the engine's design. The firing intervals of the engine are furthermore fixed by the V angle if split pin cranks are not provided. The latter in turn have a substantial influence on the both the rotational irregularity of the flywheel and the torsional dynamics of the crankshaft. Furthermore, the forces in the crankshaft bearing are equally dependent on the V angle since it defines the directions of the cylinder forces and, via the firing interval, the degree of the superposition of the single forces in a bearing.

It is of advantage for the development of a robust engine with a moderate torsional stress on the crankshaft to select a crank train configuration which is adapted to the number of cylinders used and which has an equidistant firing interval. The selected crankshaft topology plays an important role here in addition to the V angle. In modern, fast-running four-stroke reciprocating piston engines, the connecting rods of a V segment typically run on a common crank pin. Two topologies must generally be distinguished with respect to the arrangement of the crank pins along the crankshaft, the so-called crank star. With the so-called simple crank star, the crank pins are distributed evenly over the angular range of 360° so that a crank star angle of $$\varphi_K = \frac{2 \cdot 360°}{N_z}$$

results, where $N_2$ designates the number of cylinders. $\varphi_K=36°$ thus results for the V20. An equidistant $\varphi_Z$ results in this case if the V angle $\alpha_V$ is selected at $\alpha_V = k \cdot \varphi_K$, with $k=1, 2 \ldots$ In this case, the firing interval is equal to the crank star angle. Possible V angles of $\alpha_V=36°$, 72°, 108°, and 144° thus result for the V20.

With the so-called double crank star, two respective crank pins lie at the same angular position in the crank star. The so-called centrally symmetrical crankshafts form a special case which can frequently be found in which the cranks along the crankshaft are arranged symmetrical with respect to the crankshaft center. They provide the advantage from a number of cylinders of 12 or more onward that no free mass forces and moments occur in operation. The following requirement for the crank star angle applies to double crank stars $$\varphi_K = \frac{4 \cdot 360°}{N_z}.$$

$\varphi_K$=72° thus results for the V20. An equidistant firing interval $\varphi_Z$ results in this case if the V angle $\alpha_V$ is selected at $$\alpha_V = k \cdot \frac{\varphi_K}{2}, \text{ with } k = 1, 3, 5 \ldots$$

In this case, the firing interval is equal to half the crank star angle. Possible V angles of $\alpha_V$=36°, and 108° thus result for the V20.

Further restrictions must be noted in the selection of the V angle. Any desired small V angles can thus not be implemented due to the diameter of the cylinder liners since otherwise penetrations would take place. As the V angle increases, in contrast, larger and larger horizontal force components result in the crankshaft bearing, which has to be considered in the bearing design. V angles larger than 120° must be evaluated critically with respect to the horizontal force introduction since there is the danger here that strains which are too large are applied to the separation plane of the bearing shells, which can result in increased wear and failure.

A V angle of 108° or in the adjacent angular range is therefore of particular advantage for the V20 engine. The advantages which can hereby be achieved will be described in more detail below with respect to FIG. 10.

A centrally symmetrical crank star can furthermore optionally be used. This reduces the number of possible crank stars to 24 and produces 12,288 possible firing sequences.

Selection of the Crank Star Based on the Observation of the Force Effect and Torque Effect of the Accelerated Masses in the Crank Train Mechanism.

In reciprocating piston engines, forces and torques occur to a substantial degree which are caused by the accelerated oscillating masses of pistons and connecting rods and by the rotating masses of the connecting rods and the crank-shaft. They can cause substantial vibrations and represent an additional load on the bearings of the crankshaft.

In this respect, the arrangement of the single cranks along the crankshaft, the so-called crank star, plays a central role since it predefines the phase offset between the mass forces of the individual crank trains and thus determines the resulting effect on the total reciprocating piston engine. In addition, the selected crank star determines the number and size of the counter-weights to be attached to the crankshaft. Since they in turn have noteworthy mass inertial torques, there is a direct correlation between the crank star and the vibration characteristics of the crank train.

It is customary to give the force and torque effect of a drive mechanism configuration not in absolute values, but rather normalized with respect to the acting masses, the crank radius, the cylinder spacing, the connecting rod ratio and the square of the angular velocity. Generally valid characteristics thus result which are independent of the respective construction size and rotational speed of the engine.

Figure 5:
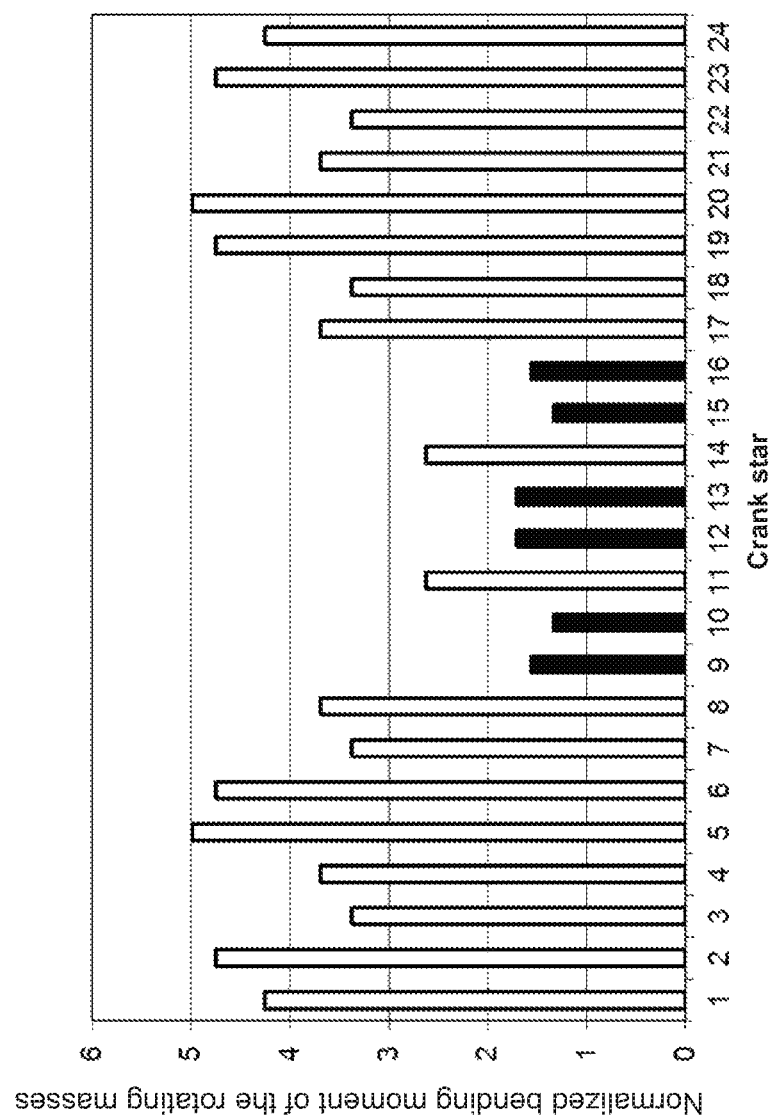
FIG. 5 shows a diagram which shows the normalized bending moment of the rotating masses for all centrally symmetrical crank stars of a V20 engine, with the optimized crank stars selected in accordance with the present disclosure having the smallest internal bending moment being marked in black.
Figure 6:
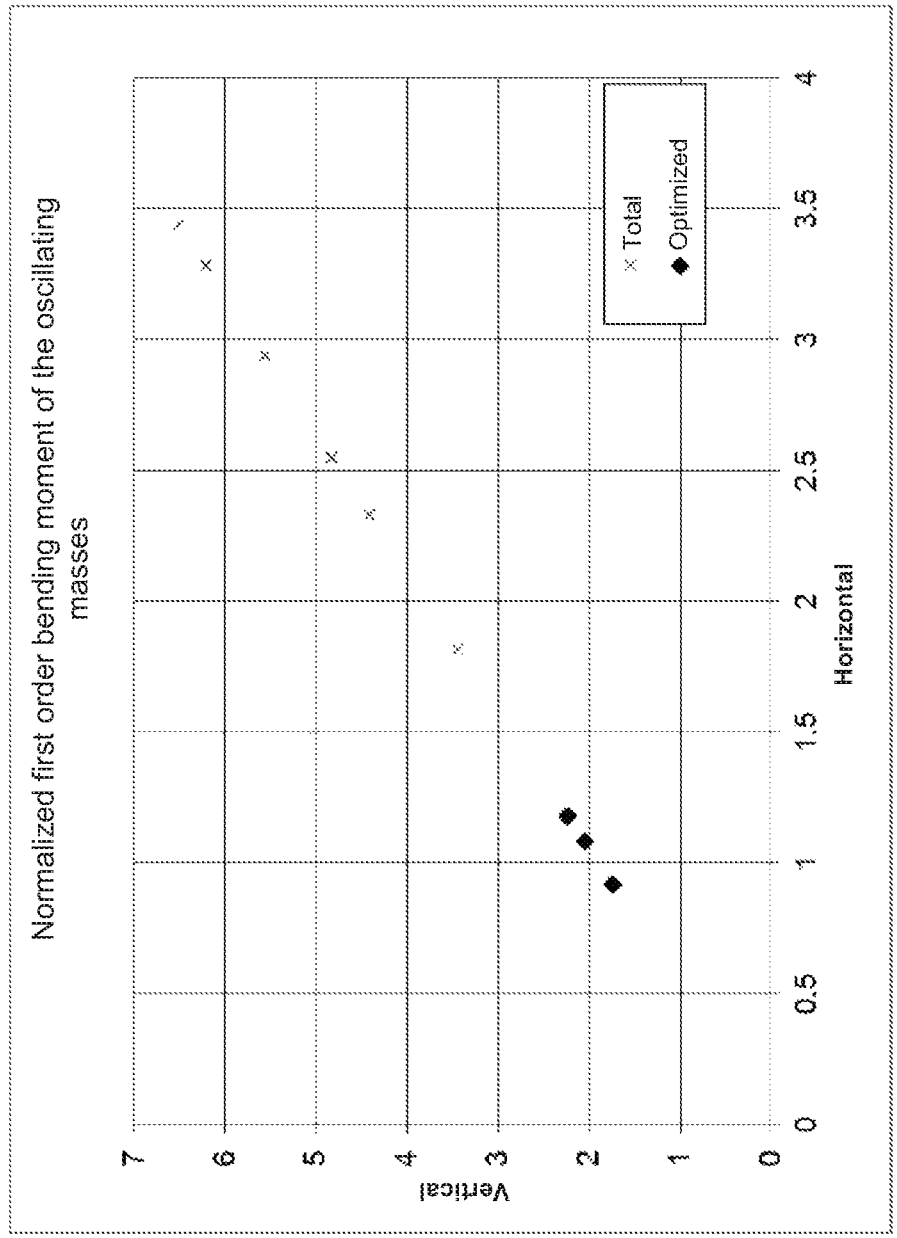
FIG. 6 shows a diagram which shows the normalized first order bending moment of the oscillating masses for all the centrally symmetrical crank stars of the V20 engine, with the optimized crank stars selected in accordance with the present disclosure being emphasized.

Due to the selected centrally symmetrical crank star, the crank drive mechanism of the V20 has no free forces and moments due to the accelerated masses. In accordance with the present disclosure, those six crank stars were therefore selected which have the smallest bending moments of the rotating masses, see FIG. 5. They are likewise optimum with respect to the horizontal and vertical 1st order bending moments of the oscillating masses, cf. FIG. 6. The crank stars in accordance with the present disclosure are in this respect shown in FIGS. 4A and 4B.

Figure 7:
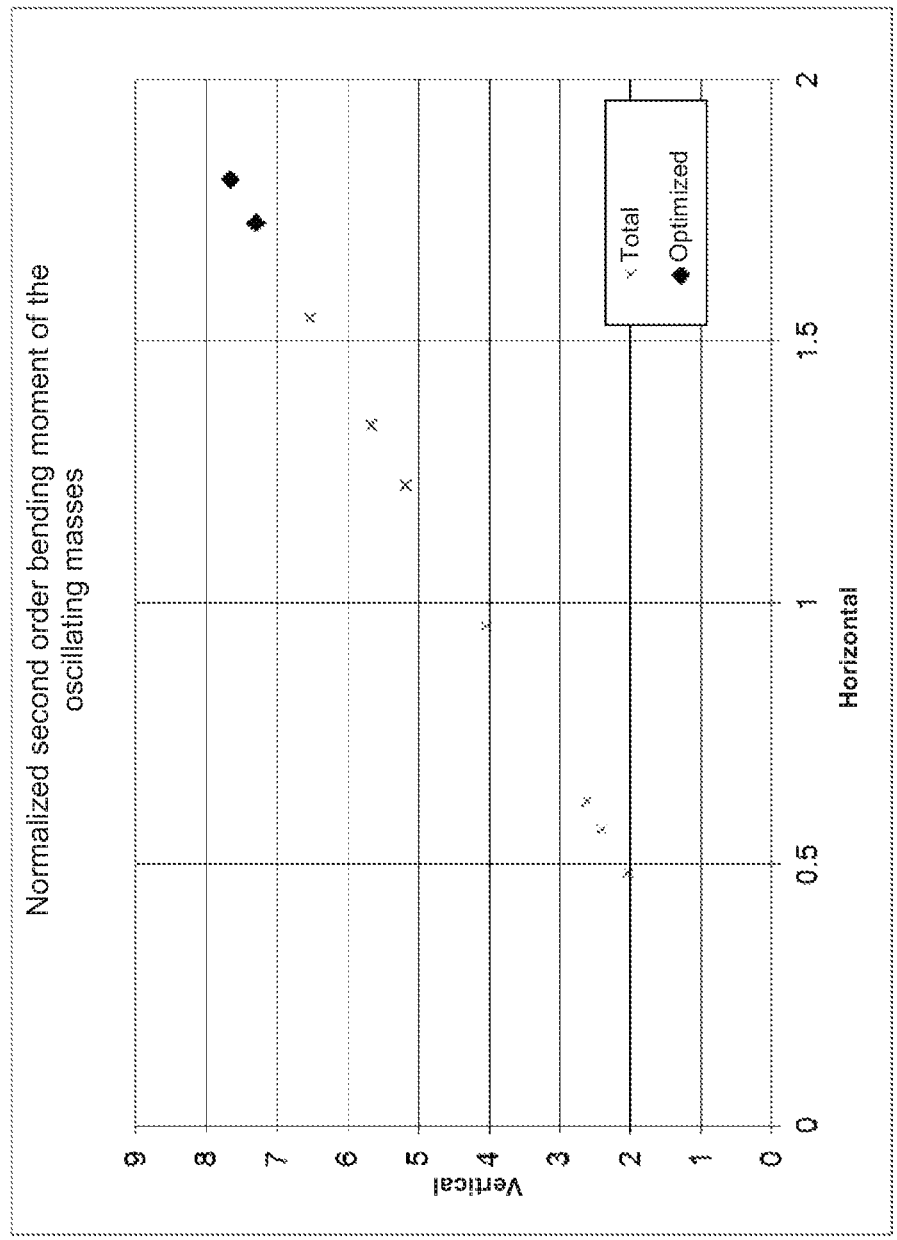
FIG. 7 shows a diagram which shows the normalized second order bending moment of the oscillating masses for all the centrally symmetrical crank stars of the V20 engine, with the crank stars optimized in accordance with the present disclosure being emphasized.

However, a disadvantage of the selected crank stars with respect to the 2nd order bending moments results such that they have the largest values, see FIG. 7. Substantial torques are in particular produced in the vertical direction here. Since the 2nd order bending moments can, however, not be compensated by the mass balancing, they have no influence on the equipping of the crankshaft with counter-weights. However, they have to be evaluated with respect to the operating vibrations of the total engine. It should be avoided in this respect that the bending mode of the engine comes into resonance with the 2nd order about the vertical axis. V engines having a small V angle are at particular risk in this respect since this bending mode typically has a very low resonance frequency due to the narrow construction. This increases the risk that the relevant resonance is in the useful speed range of the engine. In the V angular range preferred in accordance with the present disclosure, however, the resonance is typically outside the speed range so that no disadvantage arises here.

Torsional Stress in the Crankshaft and Dissipation in the Torsional Vibration Damper.

The total crank train of a reciprocating piston engine, consisting of a crankshaft, single cranks, and flywheels, represents a torsional vibration system which is excited to vibrations by the transient torque developments of the individual cylinders. The fundamental dynamic properties of the vibration system can be described by the latter's eigenmodes. The respective excitation of an eigenmode substantially depends on the firing sequence since it determines the respective phase offsets between the torque developments of the individual cylinders.

Every torsion deformation of the crankshaft is necessarily accompanied by corresponding mechanical stresses. In modern high-speed four-stroke reciprocating piston engines, the latter reach unpermitted high values with respect to the fatigue strength of the crankshaft material in the critical regions which typically lie in the transition radii of the main pins and of the crank pins as well as in the oil bore outlets. In order nevertheless to ensure a safe operation, the vibration amplitudes and the torsional stresses caused thereby have to limited to the permitted amount. This is achieved as a rule in that a torsional vibration damper is attached to the side of the crankshaft disposed opposite the flywheel, the free end. In practice, different technical solutions have been established here such as the rubber damper, the viscous oil torsional vibration damper, and the leaf spring damper whose use is associated with increasing costs in the named order.

It must be noted in the optimization of the firing sequence that the torsional vibration damper used in the simulation model can influence the optimization result. It is therefore necessary to include these parameters in the optimization or to at least define them meaningfully as part of a pre-study. In the present case, a viscous oil torsional vibration damper in a simple design was in particular taken into account.

Both the manner of construction and the required size of the damper are decisively determined by the torsional vibrations occurring in engine operation. In addition to the engine size, the power density and the vibration characteristics of the total cranktrain, the selected firing sequence plays a central role here since it decisively determines the characteristic of the vibration amplitudes in the speed range of the reciprocating piston engine. The required construction size of the damper can be substantially reduced in part by the selection of a firing sequence advantageous in a technical vibration aspect. It is frequently also possible to switch to a simpler damper construction type, e.g. the use of a viscous oil torsional vibration damper instead of a leaf spring damper, which includes substantial cost advantages. Both the construction space required for the damper and the costs of the damper therefore decisively depend on the selection of the firing sequence.

The maximum torsional stress amplitude of a crankshaft which can be withstood in a fatigue-endurable manner substantially depends on the crankshaft material used and on its machining. The selection of a firing sequence which is "compliant" from a technical vibration aspect can occasionally reduce the torsional stresses so much that a less expensive crankshaft material or a simpler machining of the critical zones of the crankshaft can be made use of Both help to significantly reduce manufacturing costs.

Both the torsional stress in the crankshaft and the damper power loss depend on the speed of the engine. The total useful application speed range of the engine is therefore looked at for the optimization and the respective maximum value of the respective criterion in the speed range is a basis for the evaluation of a firing sequence.

The torsional dynamics furthermore depend on the inertia at the flywheel side. To cover an application range which is as wide as possible, a heavy-duty application with a large flywheel and with a torsionally flexible decoupling of the drivetrain was looked at such as can be used in a plurality of areas.

A torsional vibration calculation is carried out for the optimization for all firing sequences which are located on the crank stars previously selected with reference to the criterion of the mass forces and mass torques.

Figure 8:
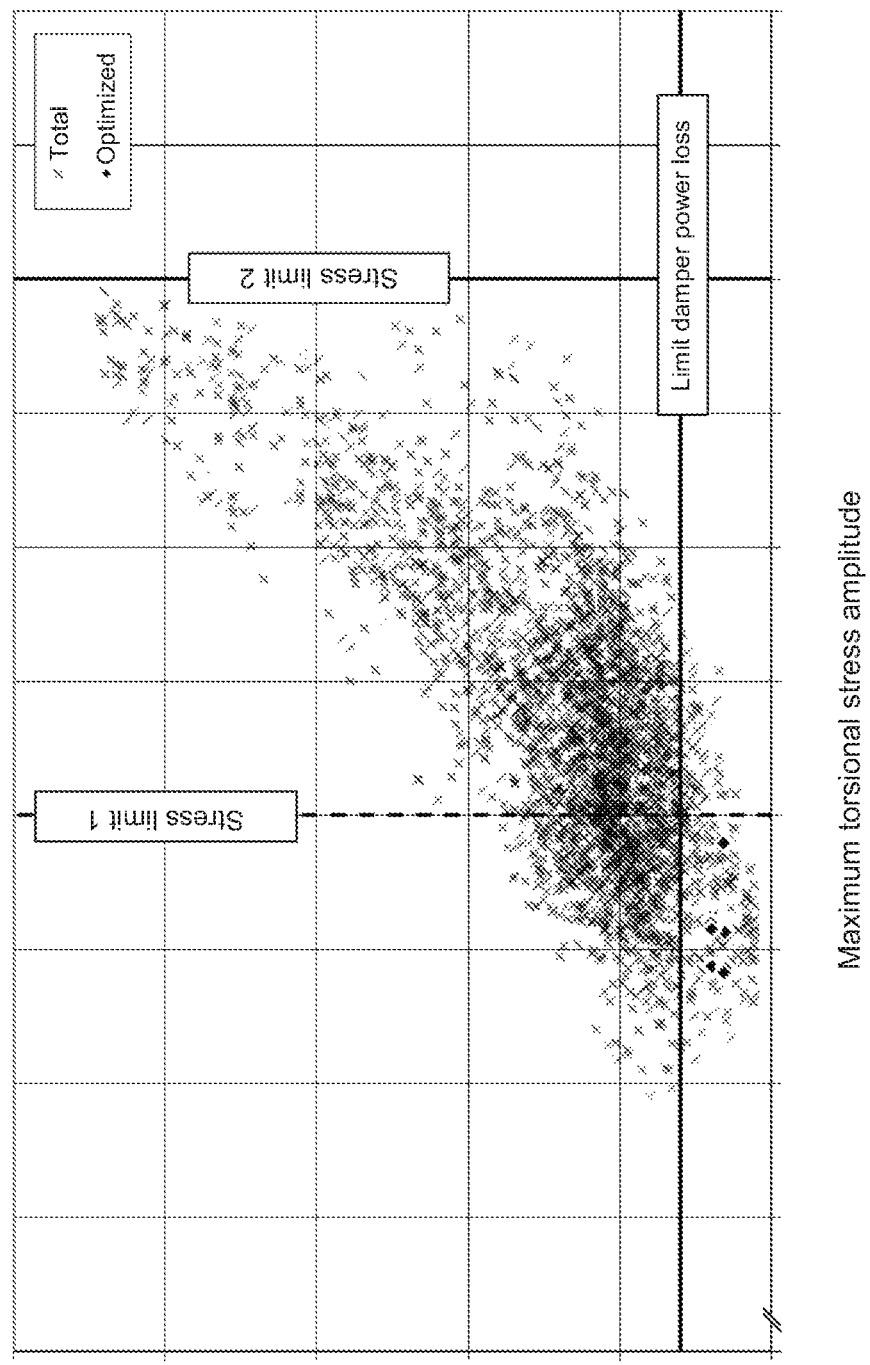
FIG. 8 shows a diagram which represents the maximum torsional stress amplitude and the maximum power loss of the torsional vibration damper on the use of a V20 engine as a drive of a heavy-duty application with a torsionally flexible coupling for all the examined firing sequences, with the firing sequences optimized in accordance with the present disclosure being emphasized; limits for the torsional stress and for the damper power loss are furthermore entered.

FIG. 8 shows by way of example the maximum damper power loss and the maximum torsional stress amplitude in the crankshaft for all the examined firing sequences for a heavy-duty application with torsionally flexible decoupling of the drivetrain. Each cross in the diagram represents a specific firing sequence in this respect. The maximum torsional stress on the crankshaft in the engine speed range occurring due to the torsional vibrations is in this respect applied over the x axis. The maximum power loss is entered over the y axis which has to be led off over the torsional vibration damper due to the torsional vibrations which are present. The values indicated represent the loads for all the examined firing sequences occurring at a maximum over the speed range. The prevailing stresses above the stress limit 2 are so strong that the fatigue endurable operation of the crankshaft cannot be ensured at all or hardly at all. The torsional stresses between stress limit 1 and stress limit 2 are still so high that typically an expensive heat-treatable steel has to be used. A crankshaft of a less expensive low grad steel material can be used for firing sequences which are below the stress limit 1. It can be recognized that the torsional vibration stress on the crankshaft can be reduced by up to approximately 35% by the selection of a favorable firing sequence.

The indicated limit for the power loss of the torsional vibration damper amounts to approximately 2 per thousand of the maximum engine power. This small value allows a compact and inexpensive viscous oil torsional vibration damper to be used. It can be recognized that the thermal load on the torsional vibration damper can be reduced by a factor of up to approximately 40 by the selection of a favorable firing sequence.

On a use of the optimum firing sequences, the torsional vibrations are limited such that, first, the use of a small and inexpensive viscous oil torsional vibration damper is possible instead of a complex and thus expensive spring leaf damper or instead of an extremely large viscous oil torsional vibration damper and, second, a less expensive crankshaft can be used. With comparatively highly limited torsional vibrations, the crankshaft can be produced from lower grade steel such as is often used in the automotive area, instead of from heat-treatable steel.

Vibration Amplitudes at the Flywheel and at the Free Crankshaft End.

With reciprocating piston engines with long crankshafts, torsional vibration amplitudes and angle accelerations occur at the free crankshaft end which are substantial in part. This has corresponding effects on gear drives and belt drives of the reciprocating piston engine which are possibly positioned here and which drive different units such as the water pump or the oil pump. When selecting the firing sequence, the torsional dynamics of the free crankshaft end may by no means be left out of consideration. Correspondingly, such firing sequences were determined which are advantageous for a plurality of applications. In addition, the vibration amplitude at the flywheel may not be left out of consideration. This is admittedly anyway moderate in comparison with engines having a small number of cylinders, but can by all means be of significance in the configuration of torsionally elastic elastomer couplings.

Figure 9:
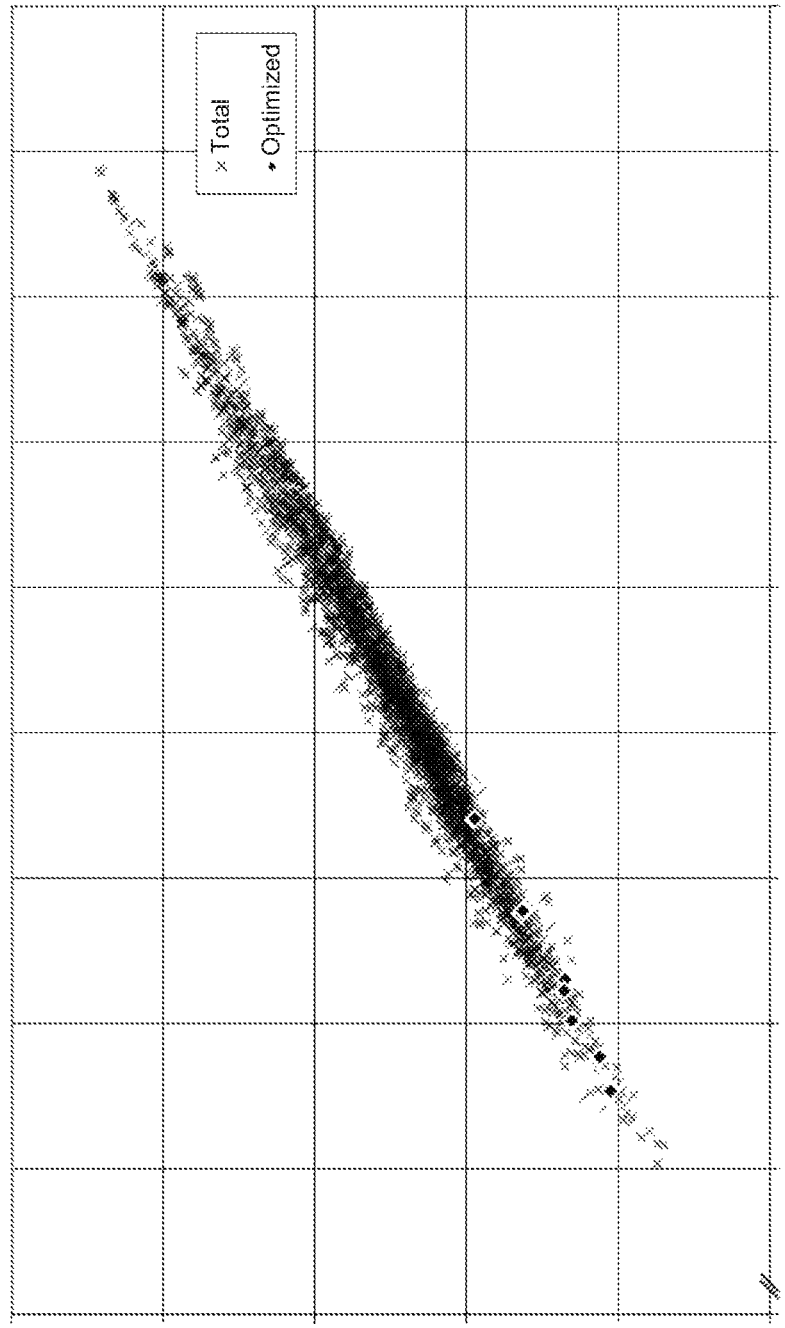
FIG. 9 shows a diagram which represents the vibration amplitude at the flywheel and the vibration amplitude at the free crankshaft end on the use of a V20 engine as a drive for a heavy-duty application with a torsionally flexible coupling for all the examined firing sequences, with the firing sequences optimized in accordance with the present disclosure being emphasized.

FIG. 9 shows the flywheel amplitudes at the flywheel and at the free crankshaft end for the heavy-duty application. It is shown here that the optimized firing sequences have comparatively small values both with respect to the vibration amplitudes at the free crankshaft end and at the flywheel.

Loads on the Crankshaft Support.

A variety of aspects have to be taken into account when dimensioning the crankshaft bearings. The underlying loads on the bearing in this respect also depend on the firing sequence in addition to the peak cylinder pressure in a variety of manners. The firing sequence first determines whether and the extent to which the forces of two adjacent cylinders in the interposed common bearing overlap in time and thus partially add up. The mass forces to be taken up by the bearing furthermore depend on the crank star and on the inner mass balancing and are thus indirectly determined by the firing sequence. An additional load on the crankshaft bearings can be caused by the torsion deformation of the crankshaft which is accompanied by a radial transposition of individual main bearing pins. If this occurs in-phase with the firing load of an adjacent cylinder in a bearing, it can result in a substantial amplification of the maximum bearing force. The firing sequence equally plays an important role with respect to the thermal load on the hydrodynamic bearings since the time interval of two consecutive peak loads is defined by it. A large interval between consecutive peak loads makes it possible to flush the bearing sufficiently with lubricant and to cool it. These aspects have to be taken into sufficient account in the selection of a firing sequence.

The number of consecutive bearing strains for the selected crank train configuration of the V20 is between one and two, in contrast. The reason for this is the selection of the wide V angle which has a favorable behavior with respect to the bearing strain. This criterion thus does not play a decisive role in the selection of the firing sequences. The optimized firing sequences all have a value of two consecutive bearing strains.

Gas Exchange Process.

The degree of filling of a cylinder substantially depends on the local pressure conditions in the intake manifold during the intake phase. They in turn depend greatly on the spatial distance of two cylinders in the same intake manifold fired directly after one another. The degree of filling of a cylinder furthermore depends on the local pressure conditions in the exhaust manifold during the emission phase. The situation here is much more complex than at the inlet side since wave propagation effects of the exhaust gas flow can substantially influence the pressure conditions. A well-founded evaluation of the charge cycle interference as a rule requires a simulation of the gas exchange process.

To achieve a degree of filling of the cylinders which is as high and as uniform as possible, it is of advantage to ensure a sufficiently large spatial distance between two cylinders fired after one another at both the intake manifold and at the exhaust manifold. Bank-alternating firing sequences have furthermore proved to be advantageous for reciprocating piston engines in V configuration with separate intake systems and exhaust gas systems at the banks since they have an interval much larger in time between two consecutive inlet procedures in the same intake passage or emission procedure in the same exhaust gas manifold. This reduces interference and thus increases the thermodynamic efficiency of the reciprocating piston engine.

In the case of the V20, only bank-alternating firing sequences are present due to the centrally symmetrical crankshaft. Only the criterion of the spacing of two cylinders fired after one another on one bank is therefore used. The number of cylinders interposed here varies between zero and three. The optimized firing sequences all have a value of three.

Torsional Dynamics of the Camshaft.

In the same way as in the case of the crankshaft, the firing sequence has a substantial influence on the torsional dynamics of the camshaft. The excitation the camshaft undergoes via the control drive thus depends, on the one hand, on the torsional dynamics of the crankshaft. Furthermore, the phase offset of the torque loads on the individual valve drives is equally fixed by the firing sequence according to the function. Depending on the type and size of construction and in dependence on secondary units possibly driven via the camshaft such as the engine coolant pump, substantial vibration amplitudes can occur here. They have to be evaluated in a separate torsional vibration calculation and the design has to take corresponding account of the stresses which occur. The torsional dynamics of the camshaft is, however, not taken into account in the firing sequence optimization since experience has shown here that sufficient design and technical possibilities are present to take account of the torsional stress.

Influence of the Construction Size, the Specific Power and the V Angle of the Engine.

The fixing to a specific firing sequence does not only fix the sequence with which the individual combustion chambers of the engine are supplied with fuel, but rather also determines the topology of the underlying crankshaft. Conversely, the number of possible firing sequences is already very greatly reduced for an existing crankshaft topology.

There is furthermore a correlation between possible firing sequences and the V angle. The firing sequences with a symmetrically configured crankshaft listed for the V20 work, viewed kinematically, in a V angle range between 72° and 144°; the advantageous properties are, however, the strongest at 108° and the direct surrounding. The advantageous properties with respect to strain on the crankshaft bearing and the gas exchange process are largely insensitive with respect to a variation of the V angle. The torsional dynamics of the crank train mechanism in contrast reacts comparatively sensitively with respect to a variation of the V angle. Angular ranges of approximately ±10° around the optimum V angle are thus advantageous.

This is illustrated by FIG. 10. The diagrams known from FIG. 8 are reproduced at the top there which show the maximum torsional stress amplitude and the maximum power loss of the torsional vibration damper on the use of a V20 engine having an optimum V angle of 108° as the drive in a heavy-duty application with a rotationally flexible coupling for all the examined firing sequences on the selected crank stars. The same diagrams are shown for comparison at the bottom for a V20 engine having a non-optimum V angle of 90° for all the examined firing sequences on the selected crank stars. As can be seen from FIG. 10, only substantially worse values for the maximum torsional stress and the maximum damper power loss can be achieved at 90° than with a V angle of 108°. The firing sequences optimized for 108, however, still have good or very good properties with respect to the damper performance and are in midfield with respect to the torsional stress.

The present study is based on an engine series with a 135 mm bore diameter and 2.25 liters cylinder displacement. The specific power in this respect amounts to 34 kW per liter displacement; the speed range is between 600 and 2100 r.p.m. The effective mass moment of inertia of the total crank train including the flywheel amounts to approximately 8 kgm$^2$. It is, however, expected that the results maintain their validity over a wide range. It can basically be assumed that the advantageous properties with respect to the torsional dynamics are equally present in a range of displacement from approximately 1 liter to 10 liters, optionally from 1.5 to 5 liters per cylinder.

The present disclosure is not restricted to specific types of construction of a four-stroke reciprocating piston engine. Reciprocating piston engines in accordance with the present disclosure can thus be operated in accordance with a diesel or gasoline internal combustion method. In this respect, both homogeneous and alternative combustion methods are conceivable.

The four-stroke reciprocating piston engines in accordance with the present disclosure can furthermore be operated with any desired fuels. The design in accordance with the present disclosure and the sequences in accordance with the present disclosure are in particular of advantage independently of the fuel selected. For example, the engine can be a gas engine, in particular a gasoline engine which can be operated with a gaseous fuel such a hydrogen, natural gas or liquefied gas. It can, however, also be an engine which is operated with liquid fuels.

The engine can furthermore be a naturally aspirated engine without charge. The present disclosure can, however, equally also be used in engines having a single-stage or multi-stage charge.

The engine can in this respect be connected to the drive either with rotationally stiffness or via a torsionally flexible or torsionally elastic coupling.

Application Possibilities

Four-stroke reciprocating piston engines in accordance with the present disclosure can be used in a variety of different applications.

In the optimization of the firing sequences, the general application "heavy duty" with a torsionally elastically coupled drivetrain was considered. Since this is the case in most industrial applications of the examined power class, this case covers a plurality of the most varied areas of application.

Possible applications include the drive of heavy-duty machines and mining machinery, with a mobile or stationary use also being possible here. Corresponding mining machinery can be usable both in underground mining and in strip mining. They can, for example, be dump trucks or excavators.

A further application possibility is the use as a main drive in a ship.

The engine can furthermore be used as a main drive in a rail vehicle. For example, the engine can in this respect drive an electric generator via which the engines of the rail vehicle can in turn be driven. Alternatively, the drive can also take place via a torque converter and/or a transmission.

The engine in accordance with the present disclosure can furthermore also be used in heavy military applications such as for the drive of armored vehicles, rocket carriers, speedboats and submarines.

The engine can furthermore be used as a drive in the oil and gas industry, in particular for the drive of pumps. A use of the engine as a drive in conveying technology and in particular as a pump drive is also conceivable outside the oil and gas industry.

The engine in accordance with the present disclosure can be used for stationary or mobile power generation.

REFERENCES

[BucLau2014] Buczek, K.; Lauer, S.: Firing order optimization in FEV virtual engine. Proceedings of the Torsional Vibration Symposium 2014, Salzburg, May 2014.
[Hen2014a] Henninger, C.: Firing Sequence Optimization for a V20 Cylinder Diesel Engine. Proceedings of the Torsional Vibration Symposium 2014, Salzburg, May 2014.
[Hen2014b] Henninger, C.: Firing Sequence Optimisation on a V20. MTZ industrial 02(2014), pp. 60-65.
[KnoMal2010] Knorr, J.; Malischewski, T.; Weiss, J.: Firing Order Optimization Based on Integrated Simulation. GTI User Conference 2010.
[MaaKli1981] Maass, H.; Klier, H.: Kräfte, Momente und deren Ausgleich in der Verbrennungskraftmaschine. Wien, 1981 [Forces, Torques and Their Compensation in the Internal Combustion Engine. Vienna 1981]
[Nes1958] Nestorides, E. J. (Ed.): *A Handbook on Torsional Vibration*. Cambridge, 1958.
[PriOva2014] Priestner, C.; Ovari, T.; Brunner, M.; Zieher, F.: Crank train torsional vibration optimization. Proceedings of the Torsional Vibration Symposium 2014, Salzburg, May 2014.
[RønNie2003] Rønnedal, P.; Nielsen, H. B.: *Firing Order Selection in Relation to Vibration Aspects*. In: Proceedings of the 2003 Spring Technical Conference of the ASME Internal Combustion Engine Division in Salzburg, pp. 311-320, 2003.
[StaHen2014] Stadelmann, M.; Henninger, C.: Mokdad, B.: *Generalized Torsional Vibration Analysis of Generating Sets for Diesel-Electric Powertrains*. Tagungsband zum 4. Kongress zu Einsatz und Validierung von Simulationsmethoden für die Antriebstechnik in Lahnstein, September 2014, S. 182-194 [Conerence Transcript of the 4$^{th}$ Congress on the Use and Validation of Simulation Methods for Drive Engineering in Lahnstein, September 2014, pp. 128-194].
[Wil1935] Wilson, W. K.: *Practical Solution of Torsional Vibration Problems*. London, 1935.

The invention claimed is:

1. A four-stroke reciprocating piston engine in a V configuration having 20 cylinders including cylinders A1 to A10 and cylinders B1 to B10, having a crankshaft with a counter-clockwise direction of rotation, having an ignition timing control which fires the cylinders A1 to A10 and the cylinders B1 to B10 in at least one of the following firing sequences, wherein the direction of rotation and a cylinder numbering are defined in accordance with DIN ISO 1204 with the cylinders A1-A10 being arranged in order along an axis of rotation of the crankshaft forming a first bank of cylinders in the V configuration and the cylinders B1-B10 being arranged in order along the axis of rotation of the crankshaft forming a second bank of cylinders in the V configuration:

a) A1-B3-A4-B9-A8-B5-A2-B1-A5-B4-A10-B8-A7-B2-A3-B6-A9-B10-A6-B7
 b) A1-B3-A4-B9-A8-B6-A2-B1-A5-B4-A10-B8-A7-B2-A3-B5-A9-B10-A6-B7
 c) A1-B2-A5-B8-A9-B4-A3-B1-A7-B6-A10-B9-A6-B3-A2-B7-A8-B10-A4-B5
 d) A1-B2-A5-B8-A9-B4-A3-B1-A7-B5-A10-B9-A6-B3-A2-B7-A8-B10-A4-B6
 e) A1-B2-A6-B8-A9-B4-A3-B1-A7-B6-A10-B9-A5-B3-A2-B7-A8-B10-A4-B5
 f) A1-B2-A6-B8-A9-B4-A3-B1-A7-B5-A10-B9-A5-B3-A2-B7-A8-B10-A4-B6
 g) A1-B3-A4-B9-A8-B5-A2-B1-A6-B4-A10-B8-A7-B2-A3-B6-A9-B10-A5-B7
 h) A1-B3-A4-B9-A8-B6-A2-B1-A6-B4-A10-B8-A7-B2-A3-B5-A9-B10-A5-B7
 i) A1-B2-A4-B8-A2-B6-A8-B10-A6-B7-A10-B9-A7-B3-A9-B5-A3-B1-A5-B4
 j) A1-B4-A3-B9-A7-B5-A2-B1-A5-B3-A10-B7-A8-B2-A4-B6-A9-B10-A6-B8
 k) A1-B4-A3-B9-A7-B6-A2-B1-A5-B3-A10-B7-A8-B2-A4-B5-A9-B10-A6-B8
 l) A1-B4-A3-B9-A7-B5-A2-B1-A6-B3-A10-B7-A8-B2-A4-B6-A9-B10-A5-B8
 m) A1-B4-A3-B9-A7-B6-A2-B1-A6-B3-A10-B7-A8-B2-A4-B5-A9-B10-A5-B8.

2. A four-stroke reciprocating piston engine in a V configuration having 20 cylinders including cylinders A1 to A10 and cylinders B1 to B10, having a crankshaft with a clockwise direction of rotation, having an ignition timing control which fires the cylinders A1 to A10 and the cylinders B1 to B10 in at least one of the following firing sequences, wherein the direction of rotation and a cylinder numbering are defined in accordance with DIN ISO 1204 with the cylinders A1 to A10 being arranged in order along an axis of rotation of the crankshaft forming a first bank of cylinders in the V configuration and the cylinders B1 to B10 being arranged in order along the axis of rotation of the crankshaft forming a second bank of cylinders in the V configuration:

a) A1-B5-A4-B10-A8-B7-A2-B3-A6-B9-A10-B6-A7-B1-A3-B4-A9-B8-A5-B2
 b) A1-B5-A4-B10-A8-B7-A2-B3-A5-B9-A10-B6-A7-B1-A3-B4-A9-B8-A6-B2
 c) A1-B7-A6-B10-A9-B6-A3-B2-A7-B8-A10-B4-A5-B1-A2-B5-A8-B9-A4-B3
 d) A1-B7-A5-B10-A9-B6-A3-B2-A7-B8-A10-B4-A6-B1-A2-B5-A8-B9-A4-B3
 e) A1-B7-A6-B10-A9-B5-A3-B2-A7-B8-A10-B4-A5-B1-A2-B6-A8-B9-A4-B3
 f) A1-B7-A5-B10-A9-B5-A3-B2-A7-B8-A10-B4-A6-B1-A2-B6-A8-B9-A4-B3
 g) A1-B6-A4-B10-A8-B7-A2-B3-A6-B9-A10-B5-A7-B1-A3-B4-A9-B8-A5-B2
 h) A1-B6-A4-B10-A8-B7-A2-B3-A5-B9-A10-B5-A7-B1-A3-B4-A9-B8-A6-B2
 i) A1-B5-A4-B1-A2-B4-A8-B2-A6-B8-A10-B6-A7-B10-A9-B7-A3-B9-A5-B3 j) A1-B5-A3-B10-A7-B8-A2-B4-A6-B9-A10-B6-A8-B1-A4-B3-A9-B7-A5-B2 k) A1-B5-A3-B10-A7-B8-A2-B4-A5-B9-A10-B6-A8-B1-A4-B3-A9-B7-A6-B2 l) A1-B6-A3-B10-A7-B8-A2-B4-A6-B9-A10-B5-A8-B1-A4-B3-A9-B7-A5-B2 m) A1-B6-A3-B10-A7-B8-A2-B4-A5-B9-A10-B5-A8-B1-A4-B3-A9-B7-A6-B2.

3. A four-stroke reciprocating piston engine in a V configuration having 20 cylinders, having a crankshaft with a counter-clockwise or clockwise direction of rotation, having a flywheel arranged on the crankshaft, wherein the crankshaft has cranks which form a crank star and at which connecting rods of the cylinders engage, the V configuration comprising a plurality of V segments, each V segment comprising a respective pair of the cylinders oppositely disposed on the crankshaft from one another with the connecting rods of each V segment respectively engaging at a common crank, wherein the crank star is of a centrally symmetrical or quasi-centrally symmetrical design; wherein cranks C1 to C10 have one of the following sequences in the direction of rotation, viewed from a flywheel side, with the cranks being numbered in order along an axis of rotation of the crankshaft by C1 to C10 starting from the flywheel side:

i) C1,10-C5,6-C2,9-C3,8-C4,7
ii) C1,10-C4,7-C3,8-C2,9-C5,6
iii) C1,10-C5,6-C3,8-C2,9-C4,7
iv) C1,10-C5,6-C2,9-C4,7-C3,8.

4. The four-stroke reciprocating piston engine in accordance with claim 1, having a flywheel arranged on the crankshaft, wherein the crankshaft has cranks which form a crank star and at which connecting rods of the cylinders engage, the V configuration comprising a plurality of V segments, each V segment comprising a respective pair of the cylinders oppositely disposed on the crankshaft from one another with the connecting rods of each V segment respectively engaging at a common crank, wherein the crank star is of a centrally symmetrical or quasi-centrally symmetrical design; wherein cranks C1 to C10 have one of the following sequences in the direction of rotation, viewed from a flywheel side, with the cranks being numbered in order along the axis of rotation of the crankshaft by C1 to C10 starting from the flywheel side:

i) C1,10-C5,6-C2,9-C3,8-C4,7
ii) C1,10-C4,7-C3,8-C2,9-C5,6
iii) C1,10-C5,6-C3,8-C2,9-C4,7
iv) C1,10-C5,6-C2,9-C4,7-C3,8;

wherein one of the following combinations of crank star and firing sequence is present:
Crank star i), one of the firing sequences a, b, g, h
Crank star ii), one of the firing sequences c, d, e, f
Crank star iii), the firing sequence i
Crank star iv), one of the firing sequences j, k, l, m.

5. A four-stroke reciprocating piston engine in a V configuration having 20 cylinders and a crankshaft with a clockwise or counter-clockwise direction of rotation,
wherein a V angle of the V configuration amounts to between 101° and 115°.

6. The four-stroke reciprocating piston engine in accordance with claim 5, wherein the V angle amounts to between 103° and 113°; and/or wherein the four-stroke reciprocating piston engine has a centrally symmetrical or quasi-centrally symmetrical crank star.

7. The four-stroke reciprocating piston engine in accordance with claim 1, wherein a V angle of the V configuration amounts to between 101° and 115°.

8. The four-stroke reciprocating piston engine in accordance with claim 1, wherein the firing sequences have an equidistant or quasi-equidistant firing interval; and wherein the firing interval between two consecutive firings amounts to between 31° and 41°;

and/or wherein the crankshaft has ten cranks which form a crank star and at which connecting rods of the cylinders engage, the V configuration comprising a plurality of V segments, each V segment comprising a respective pair of the cylinders oppositely disposed on the crankshaft from one another with the connecting rods of each V segment each engaging at a common crank, with the crank star being of a centrally symmetrical or quasi-centrally symmetrical design, with an angle between cranks having a same spacing from a crankshaft center being less than 5°; and/or wherein the cranks are distributed equidistantly or quasi-equidistantly over both crankshaft halves, with the angular spacing between cranks following one another at an angle on both crankshaft halves respectively amounting to between 67° and 77°.

9. The four-stroke reciprocating piston engine in accordance with claim 1, wherein the crankshaft is produced from a self-hardening, micro-alloyed steel;

and/or having a torsional vibration damper, wherein a power loss of the torsional vibration damper amounts to less than 6 per thousand of a maximum engine power; and/or wherein it is a viscous oil torsional vibration damper;

and/or having a flywheel arranged on the crankshaft, with the torsional vibration damper arranged at a side of the crankshaft disposed opposite the flywheel.

10. The four-stroke reciprocating piston engine in accordance with claim 1, wherein a cylinder displacement amounts to between 1 liter and 10 liters;

and/or wherein a maximum power per liter displacement amounts to between 20 kW and 80 kW;

and/or wherein the engine is operable in a speed range which lies between 400 and 3000 r.p.m;

and/or wherein the engine has an engine speed control which operates the engine at a desired engine speed, with the desired engine speed being adaptable to engine and/or load conditions by the engine speed control;

and/or wherein the engine is a gas engine and/or is operable with a liquid fuel, with the engine being operable with at least one of the following fuels: gaseous fuel, diesel, and/or gasoline;

and/or wherein the engine has direct injection and/or high-pressure injection;

and/or wherein the engine is operable by a diesel combustion method or by a gasoline combustion method;

and/or wherein the engine speed control is configured such that the engine is operable by a homogeneous-charge, a stratified-charge, and/or another combustion method;

and/or wherein the engine is a naturally aspirated engine or has a single-stage or multi-stage charge.

11. The four-stroke reciprocating piston engine in the V configuration in accordance with claim 1,
wherein the engine is used as a drive in a heavy-duty machine; and/or mining machinery; and/or an earth-moving machine; and/or a transport machine; and/or a transfer machine; wherein the engine drives a generator or a hydraulic pump via which an undercarriage and/or working units of the heavy-duty machine, and/or the mining machinery; and/or the earth-moving machine; and/or the transport machine; and/or the transfer machine are driven; and/or wherein the engine drives an undercarriage and/or working units of the heavy-duty machine and/or the mining machinery; and/or the earth-moving machine; and/or the transport machine; and/or the transfer machine directly or via a transmission which is further connected to the engine by means of a mechanical clutch and/or a torque converter; wherein the heavy-duty machine; and/or the mining machinery; and/or the earth-moving machine; and/or the transport machine; and/or the transfer machine is a stationary machine or a mobile machine;

and/or wherein the engine is used as a main drive in a ship, with the engine driving a propeller shaft of the ship directly or via a clutch and/or a transmission;

and/or in that the engine is used as the main drive in a rail vehicle;

and/or wherein the engine is used as the main drive in heavy military applications;

and/or wherein the engine is used as the drive in fluid-conveying technology and/or in the oil and gas industry;

and/or wherein the engine is used for power generation, with the four-stroke reciprocating piston engine driving the generator;

and/or wherein the crankshaft of the engine and a load are connected to one another in a torsionally rigid manner or via a torsionally flexible coupling.

12. A machine with the four-stroke reciprocating piston engine of claim 1, wherein the machine is a stationary machine or a mobile machine, and/or mining machinery; and/or an earth-moving machine; and/or a transport machine; and/or a transfer machine; a ship; a rail vehicle; a heavy military machine; a fluid-conveying machine; an oil-extraction and/or gas-extraction machine; an oil and/or gas transport machine; and/or an oil and/or gas processing machine; and/or a power generation unit.

13. The four-stroke reciprocating piston engine in accordance with claim 2, having a flywheel arranged on the crankshaft, wherein the crankshaft has cranks which form a crank star and at which connecting rods of the cylinders engage, the V configuration comprising a plurality of V segments, each V segment comprising a respective pair of the cylinders oppositely disposed on the crankshaft from one another with the connecting rods of each V segment respectively engaging at a common crank, wherein the crank star is of a centrally symmetrical or quasi-centrally symmetrical design; wherein cranks C1 to C10 have one of the following sequences in the direction of rotation, viewed from a flywheel side, with the cranks being numbered in order along the axis of rotation of the crankshaft by C1 to C10 starting from the flywheel side:
i) C1,10-C5,6-C2,9-C3,8-C4,7
ii) C1,10-C4,7-C3,8-C2,9-C5,6
iii) C1,10-C5,6-C3,8-C2,9-C4,7
iv) C1,10-C5,6-C2,9-C4,7-C3,8;
wherein one of the following combinations of crank star and firing sequence is present:
Crank star i), one of the firing sequences a, b, g, h
Crank star ii), one of the firing sequences c, d, e, f
Crank star iii), the firing sequence i
Crank star iv), one of the firing sequences j, k, l, m.

14. The four-stroke reciprocating piston engine in accordance with claim 2, wherein a V angle of the V configuration amounts to between 101° and 115°.

15. The four-stroke reciprocating piston engine in accordance with claim 2, wherein the firing sequences have an equidistant or quasi-equidistant firing interval; and wherein the firing interval between two consecutive firings amounts to between 31° and 41°;

and/or wherein the crankshaft has ten cranks which form a crank star and at which connecting rods of the cylinders engage, the V configuration comprising a plurality of V segments, each V segment comprising a respective pair of the cylinders oppositely disposed on the crankshaft from one another with the connecting rods of each V segment engaging at a common crank, with the crank star being of a centrally symmetrical or quasi-centrally symmetrical design, with an angle between cranks having a same spacing from a crankshaft center being less than 5°; and/or wherein the cranks are distributed equidistantly or quasi-equidistantly over both crankshaft halves, with the angular spacing between cranks following one another at an angle on both crankshaft halves respectively amounting to between 67° and 77°.

16. The four-stroke reciprocating piston engine in accordance with claim 3, wherein a V angle of the V configuration amounts to between 101° and 115°.

17. The four-stroke reciprocating piston engine in accordance with claim 3, wherein the firing sequences have an equidistant or quasi-equidistant firing interval; and wherein the firing interval between two consecutive firings amounts to between 31° and 41°;

and/or wherein the crankshaft has ten cranks which form the crank star and at which the connecting rods of the cylinders engage, with an angle between cranks having a same spacing from a crankshaft center being less than 5° ; and/or wherein the cranks are distributed equidistantly or quasi-equidistantly over both crankshaft halves, with the angular spacing between cranks following one another at an angle on both crankshaft halves respectively amounting to between 67° and 77°.

18. The four-stroke reciprocating piston engine in accordance with claim 5, wherein firing sequences have an equidistant or quasi-equidistant firing interval; and wherein the firing interval between two consecutive firings amounts to between 31° and 41°;

and/or wherein the crankshaft has ten cranks which form a crank star and at which connecting rods of the cylinders engage, the V configuration comprising a plurality of V segments, each V segment comprising a respective pair of the cylinders oppositely disposed on the crankshaft from one another with the connecting rods of each V segment engaging at a common crank, with the crank star being of a centrally symmetrical or quasi-centrally symmetrical design, with an angle between cranks having a same spacing from a crankshaft center being less than 5° ; and/or wherein the cranks are distributed equidistantly or quasi-equidistantly over both crankshaft halves, with the angular spacing between cranks following one another at an angle on both crankshaft halves respectively amounting to between 67° and 77°.

19. The four-stroke reciprocating piston engine in accordance with claim 2, wherein the crankshaft is produced from a self-hardening, micro-alloyed steel;

and/or having a torsional vibration damper, wherein a power loss of the torsional vibration damper amounts to less than 6 per thousand of a maximum engine power; and/or wherein it is a viscous oil torsional vibration damper;

and/or having a flywheel arranged on the crankshaft, with the torsional vibration damper arranged at a side of the crankshaft disposed opposite the flywheel.

20. The four-stroke reciprocating piston engine in accordance with claim 3, wherein the crankshaft is produced from a self-hardening, micro-alloyed steel;

and/or having a torsional vibration damper, wherein a power loss of the torsional vibration damper amounts to less than 6 per thousand of a maximum engine power; and/or wherein it is a viscous oil torsional vibration damper;

and/or having a flywheel arranged on the crankshaft, with the torsional vibration damper arranged at a side of the crankshaft disposed opposite the flywheel.

21. The four-stroke reciprocating piston engine in accordance with claim 5, wherein the crankshaft is produced from a self-hardening, micro-alloyed steel;

and/or having a torsional vibration damper, wherein a power loss of the torsional vibration damper amounts to less than 6 per thousand of a maximum engine power; and/or wherein it is a viscous oil torsional vibration damper;

and/or having a flywheel arranged on the crankshaft, with the torsional vibration damper arranged at a side of the crankshaft disposed opposite the flywheel.

\* \* \* \* \*